(12) United States Patent
Roberts et al.

(10) Patent No.: US 9,950,424 B2
(45) Date of Patent: Apr. 24, 2018

(54) ROBOTIC SERVICING MULTIFUNCTIONAL TOOL

(71) Applicant: MacDonald, Dettwiler and Associates Inc., Brampton (CA)

(72) Inventors: Paul Roberts, Brampton (CA); Stephen Bratsberg, Mississauga (CA); Giuseppe Rago, Mississauga (CA)

(73) Assignee: MacDonald, Dettwiler and Associates Inc., Brampton, ON (CA)

( * ) Notice: Subject to any disclaimer, the term of this patent is extended or adjusted under 35 U.S.C. 154(b) by 0 days.

(21) Appl. No.: 15/621,362

(22) Filed: Jun. 13, 2017

(65) Prior Publication Data

US 2017/0274526 A1 Sep. 28, 2017

Related U.S. Application Data

(62) Division of application No. 13/652,339, filed on Oct. 15, 2012, now Pat. No. 9,676,096.

(Continued)

(51) Int. Cl.
*G05B 19/00* (2006.01)
*B25J 9/16* (2006.01)
(Continued)

(52) U.S. Cl.
CPC ............. *B25J 9/16* (2013.01); *B23Q 3/155* (2013.01); *B23Q 3/15526* (2013.01); *B25J 15/04* (2013.01)

(58) Field of Classification Search
CPC .. B25J 9/16; B25J 15/04; B23Q 3/155; B23Q 3/15526
See application file for complete search history.

(56) References Cited

U.S. PATENT DOCUMENTS 3,953,039 A    4/1976 Hauge et al.
4,516,678 A *  5/1985 Fotiadis ............. G11B 33/0472
                                         206/308.3
(Continued)

FOREIGN PATENT DOCUMENTS

CA    2473981    1/2006
CA    2680364    9/2008
(Continued)

OTHER PUBLICATIONS

Oda M et al.: "ETS-VII, space robot in-orbit experiment satellite," Robotics and Automation, 1996. Proceedings., 1996 IEEE International Conference on Minneapolis, MN, USA Apr. 22-28, 1996, New York, NY, USA IEEE, US, vol. 1, Apr. 22, 1996, pp. 739-744.

(Continued)

*Primary Examiner* — Ian Jen

(57) ABSTRACT

Herein is disclosed a multifunctional tool with replaceable tool tips. The disclosed multifunctional tool may be used as an end-effector on a robotic arm in space. Each tool tip, when in the tool holder, is driven by a common motor. The same motor can also be used to control the orientation of the tool tip about an axis. The tool tips are replaceable in the tool holder by simple and robust means, resulting in a lighter and cheaper multifunctional tool. The tool tips can be variously adapted to perform a variety of functions, including cutting, grasping, drilling, driving, etc. Since the tool may be driven by only one actuator, and the single actuator may be used to drive both the tool and rotation of the tool, mass can be saved. Use of such a multifunctional tool also reduces overall system power requirements, and system complexity.

2 Claims, 21 Drawing Sheets

Related U.S. Application Data

(60) Provisional application No. 61/546,770, filed on Oct. 13, 2011.

(51) Int. Cl.
*B23Q 3/155* (2006.01)
*B25J 15/04* (2006.01)

(56) References Cited

U.S. PATENT DOCUMENTS

| | | | |
|---|---|---|---|
| 4,609,169 | A | 9/1986 | Schweickert et al. |
| 4,720,221 | A | 1/1988 | Yoshioka et al. |
| 4,831,531 | A | 5/1989 | Adams et al. |
| 4,897,014 | A | 1/1990 | Tietze |
| 4,955,654 | A | 9/1990 | Tsuchihashi et al. |
| 5,322,494 | A | 6/1994 | Holtey et al. |
| 5,511,748 | A | 4/1996 | Scott |
| 5,582,366 | A | 10/1996 | Hamant et al. |
| 5,803,407 | A | 9/1998 | Scott |
| 5,806,802 | A | 9/1998 | Scott |
| 6,484,973 | B1 | 11/2002 | Scott |
| 6,739,555 | B2 | 5/2004 | Mazanek et al. |
| 6,843,446 | B2 | 1/2005 | Scott |
| 7,156,348 | B1 | 1/2007 | Kistler et al. |
| 7,370,835 | B2 | 5/2008 | Kistler et al. |
| 7,575,200 | B2 | 8/2009 | Behrens et al. |
| 7,823,837 | B2 | 11/2010 | Behrens et al. |
| 8,074,935 | B2 | 12/2011 | Gryniewski et al. |
| 8,181,911 | B1 | 5/2012 | Gryniewski et al. |
| 8,196,870 | B2 | 6/2012 | Gryniewski et al. |
| 9,676,096 | B2 | 6/2017 | Roberts et al. |
| 2004/0026571 | A1 | 2/2004 | Scott |
| 2006/0060328 | A1* | 3/2006 | Ewes ............... H01L 23/427 165/80.2 |
| 2006/0145024 | A1 | 7/2006 | Kosmas et al. |
| 2006/0151671 | A1 | 7/2006 | Kosmas et al. |
| 2007/0051854 | A1 | 3/2007 | Behrens et al. |
| 2007/0125910 | A1 | 6/2007 | Cepollina et al. |
| 2007/0228219 | A1 | 10/2007 | Behrens et al. |
| 2007/0228220 | A1 | 10/2007 | Behrens et al. |
| 2009/0044655 | A1 | 2/2009 | DeLouis et al. |
| 2009/0224490 | A1* | 9/2009 | Homrich ............... B23D 21/00 279/46.7 |
| 2013/0103193 | A1* | 4/2013 | Roberts ............... B23Q 3/155 700/245 |
| 2013/0153710 | A1* | 6/2013 | Roberts ............... B64G 4/00 244/172.5 |
| 2015/0097084 | A1* | 4/2015 | Szabo ............... B64G 1/1078 244/171.1 |

FOREIGN PATENT DOCUMENTS

| | | |
|---|---|---|
| DE | 102008061978 | 7/2010 |
| WO | 2007117373 | 10/2007 |
| WO | 2007126526 A1 | 11/2007 |
| WO | 2008066512 | 6/2008 |
| WO | 2011019742 | 2/2011 |
| WO | 2012113621 | 8/2012 |

OTHER PUBLICATIONS

Madison, Richard "Micro-Satellite Based, On-Orbit Servicing Work at the Air Force Research Laboratory," In: Aerospace Conference Proceedings, 2000IEEE, Big Sky, MT, USA: Mar. 18, 2000 to Mar. 25, 2000, vol. 4 ISBN: 0-7803-5846-5, p. 215-226.

Eberhardt et al, "Orbital Spacecraft Resupply Technology," In AIAA/ASME/SAE/ASEE 22nd Joint Propulsion Conference Jun. 16-18, 1986, Huntsville, Alabama.

Cox, G.R., et al. "Orbital Spacecraft Consumables Resupply System (OSCRS), Final Report, vol. II, Study Results", National Aeronautics and Space Administration Lyndon B. Johnson Space Center, Mar. 1987.

European Search Report; (EP 8733557.6); MacDonald Dettwiler & Associates Inc., Completed Jan. 14, 2011.

Manouchehri et al., "Automated Resupply of Consumables: Enhancement of Space Commercialization Opportunities" In: Fifth Annual Workshop on Space Operations Applications and Research (SOAR '91) NASA CP-3127, Kumar Krishen, 788 pages, published by NASA, Washington, D.C. 1992, p. 407-411.

Kosmas et al., "On-Orbit-Servicing by 'HERMES On-Orbit-Servicing System', Policy Robust Planning", American Institute of Aeronautics and Astronautics, 4 pages.

International Search Report (PCT/CA2012/050876) dated Apr. 24, 2013.

International Search Report (PCT/CA2012/000947) dated Mar. 28, 2013.

Jasiobedski, P. et al., "Pose Determination and Tracking for Autonomous Satellite Capture", Jun. 2001, Conference proceeding: 6th International Symposium on Artificial Intelligence, Robotics and Automation in Space, Montreal downloaded on Mar. 15, 2013 from: http://nparc.cisti-icist.nrc-enrc.gc.ca/npsi/ctrl?action=rtdoc&an=5763623&lang=en.

"The Structure of Canaderm"—Brochure (Canadian Space Agency), Nov. 7, 2011, 4 pages total, downloaded on Mar. 15, 2013 from: http://www.asc-csa.gc.ca/eng/canaderm/description.asp.

* cited by examiner

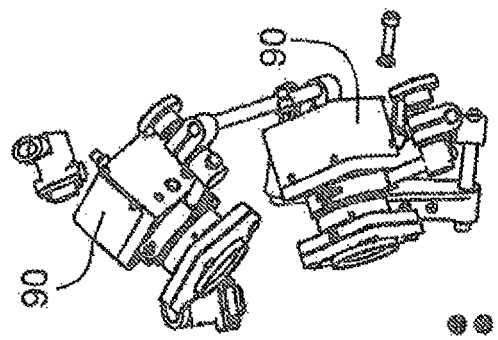
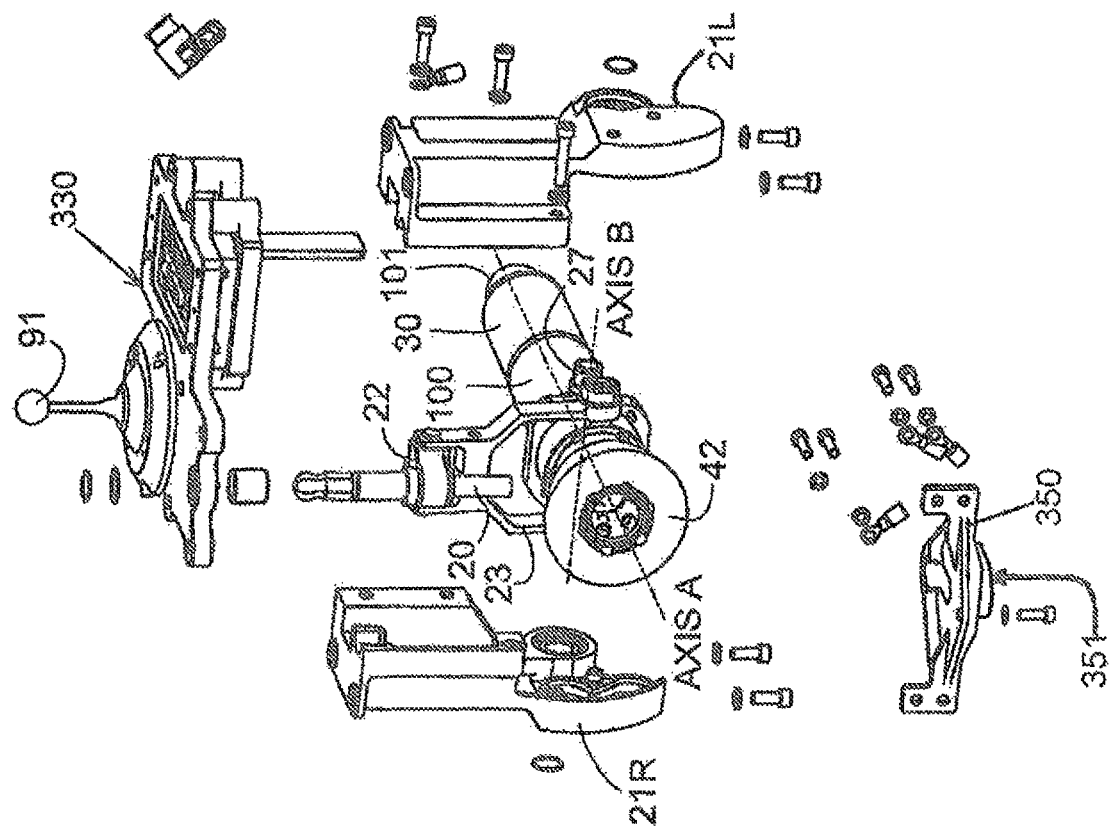
Figure 7a

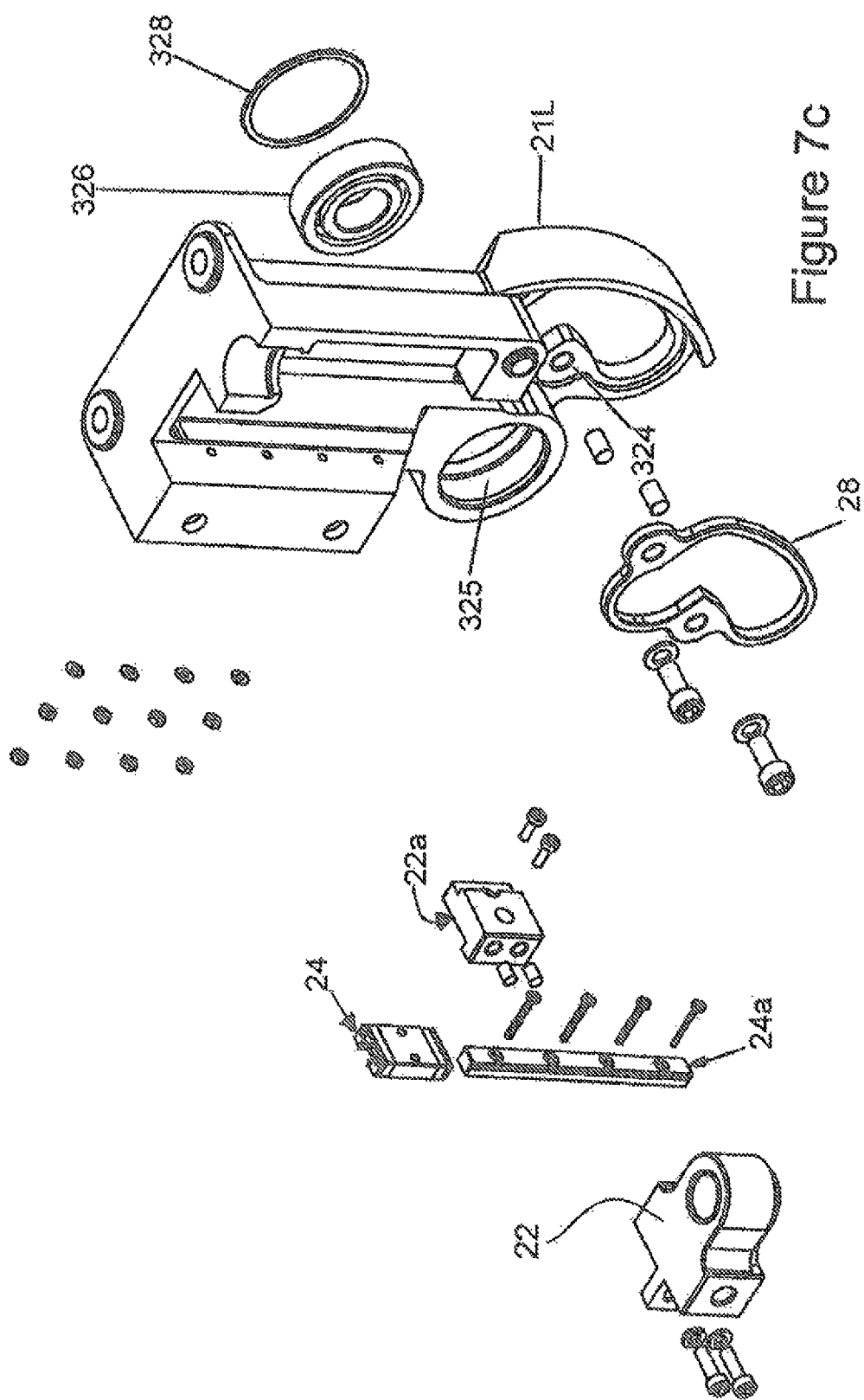

ROBOTIC SERVICING MULTIFUNCTIONAL TOOL

CROSS REFERENCE TO RELATED U.S. PATENT APPLICATION

This patent application is a divisional application of U.S. non-provisional patent application Ser. No. 13/652,339, filed Oct. 15, 2012, and which has issued as U.S. Pat. No. 9,676,096, on Jun. 13, 017, and which is based on U.S. provisional patent application Ser. No. 61/546,770, filed on Oct. 13, 2011, entitled ROBOTIC SERVICING MULTIFUNCTIONAL TOOL, filed in English, all of which are incorporated herein in their entirety by reference.

FIELD OF THE INVENTION

The present disclosure relates to a multifunctional tool with replaceable tool tips. The disclosed multifunctional tool may be used as an end-effector on a robotic arm in space.

BACKGROUND

Robotic tools for space manipulators fall into one of two categories: 1) tools that are used to operate upon prepared interfaces (i.e. hardware that was designed together with the tools themselves, to facilitate the execution of robotic operations), and 2) tools that are used to operate upon unprepared interfaces (i.e. hardware that was not specifically designed to accommodate robotic operations, and that may be designed in such a way that make robotic operations very difficult).

The Special Purpose Dextrous Manipulator, or Dextre, provided to the International Space Station (ISS) by the Canadian Space Agency (CSA), is equipped with tools targeted to prepared interfaces. Dextre's tools are described at the following link: http://www.asc-csa.gc.ca/eng/iss/dextre/toolbox.asp. They are described in greater detail below.

a) Socket Extension Tool (SET). Dextre grips this tool with its end-effector, and uses it to extend the reach of the end-effector's socket driver mechanism. It can actuate 7/16" bare bolts. This type of bolt is a standard size used for tie-down interfaces on the ISS. The SET incorporates a wobble socket, which provides the necessary compliance for robotically interfacing to a tie-down bolt with no co-located visual target. This tool was designed by MDA.

b) Robot Micro Conical Tool (RMCT). Dextre's end-effector was designed to directly interface with Micro-Fixtures and H-Fixture (robotic grasp features with a square/rectangular profile). Another fixture commonly used on the ISS is the Micro Conical Fitting (MCF) which, although designed to be robotically compatible with a collocated visual target, possesses round profiles and therefore is not directly compatible with Dextre's end-effector jaws. The RMCT is a tool equipped with a micro-fixture that allows Dextre to grasp it. The RMCT then allows Dextre to pick up payloads that are equipped with an MCF. This tool was designed by Oceaneering Space Systems.

c) Robotic Offset Tool. Dextre grips this tool with its end-effector, and uses it to access secondary tie-down bolts on specific station payloads (Orbit Replaceable Units or ORUs) where clearance constraints with adjacent equipment prevents Dextre's end-effector from being able to engage its socket drive directly to the tie down bolt. The tool gives Dextre access to tie-down points that it would be unable to access otherwise. The tool is designed for compatibility with Dextre, and with specific ISS payloads. This tool was designed by Boeing.

In addition to tools designed for ISS payloads, the Hubble Robotic Servicing Mission (http://www.edcheung.com/job/hrsdm/hrsdm.htm) explored the development of Dextre compatible tools that could be used to service hardware that had been launched on the Hubble Space Telescope. The Hubble Space Telescope was designed for servicing by astronauts—it is not equipped with features to facilitate robotic servicing, such as grapple fixtures, visual cues, or a physical equipment layout that provides a generous robotic workspace envelope. A ground testbed version of Dextre was installed at Goddard Space Flight Center, and demonstrations of tool concept prototypes were performed on a full scale mockup of the Hubble telescope. Robotic tools developed for these unprepared interfaces included electrical connector tools and tools that were used to access and actuate door latch fasteners. Hubble interface designs made no accommodations for robotic operations—special tools had to be designed for these unprepared interfaces that allowed operators to perform operations remotely and reliably.

The Hubble Servicing Mission was eventually cancelled, but the development of tools for unprepared interfaces continued both at Goddard Space Flight Center and at MDA/CSA.

Other prepared, robotically compatible tool interfaces have been developed by the European Space Agency (ESA). The Compact Tool Exchange Device (CTED) is designed for Eurobot, a three arm robot concept that is being developed to perform extravehicular activities (EVA) on the ISS. A description of this interface can be found at the following link and paper: http://www.esa.int/TEC/Robotics/SEMRIQNSP3F_0.html, A novel concept for a tool exchange device, Kester, G. J. A. N.; Visser, Proceedings of the 11th European Space Mechanisms and Tribology Symposium, ESMATS 2005, 21-23 Sep. 2005, Lucerne, Switzerland). CTED will enable the exchange of end effectors or tools, while allowing control signals and electrical power to pass from the arm to the tool. It consists of two types of components, one active unit, fixed to the robot arm, and several passive parts, fixed to the different tools and end effectors. Once the tool is positioned within reach of the arm, CTED is intended to automatically perform the attachment and release of the tool and the mating and de-mating of its electrical connectors. CTED provides alignment features that help guide the robot arm into the correct position and orientation for latching.

NASA has proposed a Robotic Refueling Mission (RRM) which is an external International Space Station experiment which is designed to demonstrate and test tools and methodologies required to refuel satellites in space, see Nasa Facts, article entitled "Robotic Refueling Mission" (FS-2011-3-11-GSFC (rev June 25)) (www.nasagov). This publication refers to tools to be tested including a Wire Cutter tool, Blanket Manipulation Tool, Multifunction Tool, the Safety Cap Removal Tool, and the Nozzle Tool. More details of these tools can be found at http://www.nasaspaceflight.com/2011/07/sts-135-enabling-new-era-robotic-satellite-refuelling-space/

Examining all of the existing robotic designs for handling multiple types of tools, a common feature is the use of a general robotic end-effector or hand which is capable of holding a tool which has its own source of motive power to apply force or torque. This is illustrated by the OTCM and CTED above. They are capable of grasping the tool and passing power to the motor(s) which provide actuation within the tool. However this means that for each tool held by the end-effector, it must possess its own single or multiple actuator. If the servicing mission requires a large number of powered tools, this will result in a large number of actuators being required in the overall robotic system to be capable of performing a variety of servicing functions. Generally, actuators are also required for grasping different tools and for adjusting the orientation of these tools.

Actuators add mass and complexity to the robotic device, and reduce robustness. Each additional actuator requires power, and necessitates the inclusion of redundancy schemes. As such, each additional actuator added to an end-effector increases the mass of that end-effector, and due to the need for more power and redundancy schemes, the mass increase is generally larger than the mass of the actuator itself. Additional mass added to the robot decreases the payload capacity of the robot, and in the case of space robotics, increases the cost of the overall mission.

SUMMARY

The present disclosure relates to a multifunctional tool with replaceable tool tips. The disclosed multifunctional tool may be used as an end-effector on a robotic arm in space. Each passive tool tip, when in the tool holder, is driven by a common actuator/motor. The same actuator/motor can also be used to control the orientation of the tool tip about an axis. The tool tips are replaceable in the tool holder by simple and robust means, resulting in a lighter and cheaper multifunctional tool. The tool tips can be variously adapted to perform a variety of functions, including cutting, grasping, drilling, driving, etc. Since the tool may be driven by only one actuator, and the single actuator may be used to drive both the tool and rotation of the tool, mass can be saved. Use of such a multifunctional tool also reduces overall system power requirements, and system complexity.

Thus, herein is disclosed a multifunctional tool comprising
i) a tool tip, said tool tip comprising
  a) a tool tip stator, and
  b) a tool tip rotor rotatable about a first axis relative to said tool tip stator; and
ii) a tool holder capable of removably engaging said tool tip, said tool holder comprising
  a) a collet,
  b) a tool tip locker, and
  c) a motive source;
wherein when said tool holder engages said tool tip,
  i) said tool tip locker restricts rotational and axial movement about said first axis of said tool tip stator relative to said collet, and
  ii) said motive source is capable of rotating said tool tip rotor about said first axis relative to said tool tip stator.

Herein is further disclosed a method of performing an action using a multifunctional tool comprising the steps of
  inserting a tool tip into a tool holder;
  locking a tool tip stator of said tool tip to a collet of said tool holder;
  coupling a tool tip rotor of said tool tip to a motive source of said tool holder;
  engaging a selector to enable said motive source of said tool holder to rotate said collet about a first axis;
  rotating, if needed, said collet locked to said tool tip stator about said first axis using said motive source;
  disengaging said selector to enable said motive source to actuate said tool tip;
  and
  actuating said tool tip using said motive source to perform said action.

Herein is further disclosed a system for remote robotic servicing, comprising:
  a) a vision system
  b) a robotic arm having an end-effector;
  c) a multifunction tool configured to be releasably grasped by said end-effector,
  d) a suite of tool tips, said multifunction tool configured to releasably grasp each of said tool tips, said multifunction tool including a motive source configured to activate said tool tip when the motive source is activated; and
  e) a computer control system programmed to control movement of said robotic arm and said motive source of said multifunction tool;
  f) a communication system configured to allow remote operation of said vision system, said robotic arm and said multifunction tool.

Also, there is provided a method for remote robotic servicing, comprising:
  a) launching a servicing spacecraft into an orbit to bring it into close proximity to a client satellite to be serviced, the spacecraft comprising
    propulsion, guidance and telemetry systems,
    a satellite capture mechanism configured to releasably capture the client satellite servicing satellite,
    a robotic arm having an end-effector,
    a multifunction tool configured to be releasably grasped by said end-effector,
    a suite of tool tips, said multifunction tool configured to releasably grasp each of said tool tips, said multifunction tool including a motive source configured to activate said tool tip when the motive source is activated,
    a vision system configured to have a field of view containing the portion of the client satellite being releasably captured and the end-effector and at least a portion of the client satellite being serviced by the multifunction tool,
    a computer control system programmed to control movement of said robotic arm and said motive source of said multifunction tool, and
    a communication system configured to allow remote operation of said vision system, said robotic arm and said multifunction tool;
  b) maneuvering the satellite into location in close proximity to the client satellite, deploying the satellite capture mechanism and releasably capturing the client satellite;
  c) deploying the robotic arm and instructing the end-effector to releasably grasp the multifunction tool, instructing the end-effector containing the multifunction tool to releasably engage a tool tip with the multifunction tool,
  d) engaging that portion of the client satellite to be serviced with the multifunction tool to service the client satellite; and
  e) wherein said communication system is configured to communicate with said computer control system for remote teleoperation control or a mixture of teleoperator and supervised autonomy control of
    approach to, and capturing of, the client satellite, and
    all actions associated with servicing the client satellite using the robotically controlled multifunction tool.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIG. 7a shows a partial exploded view of the assembly of FIG. 7 absent the video cameras on the left hand side of the FIG. 7a.

FIGS. 7c and 7d shows an exploded view of part of a tilter mechanism forming part of the multifunction tool.

DETAILED DESCRIPTION

Figure 1:
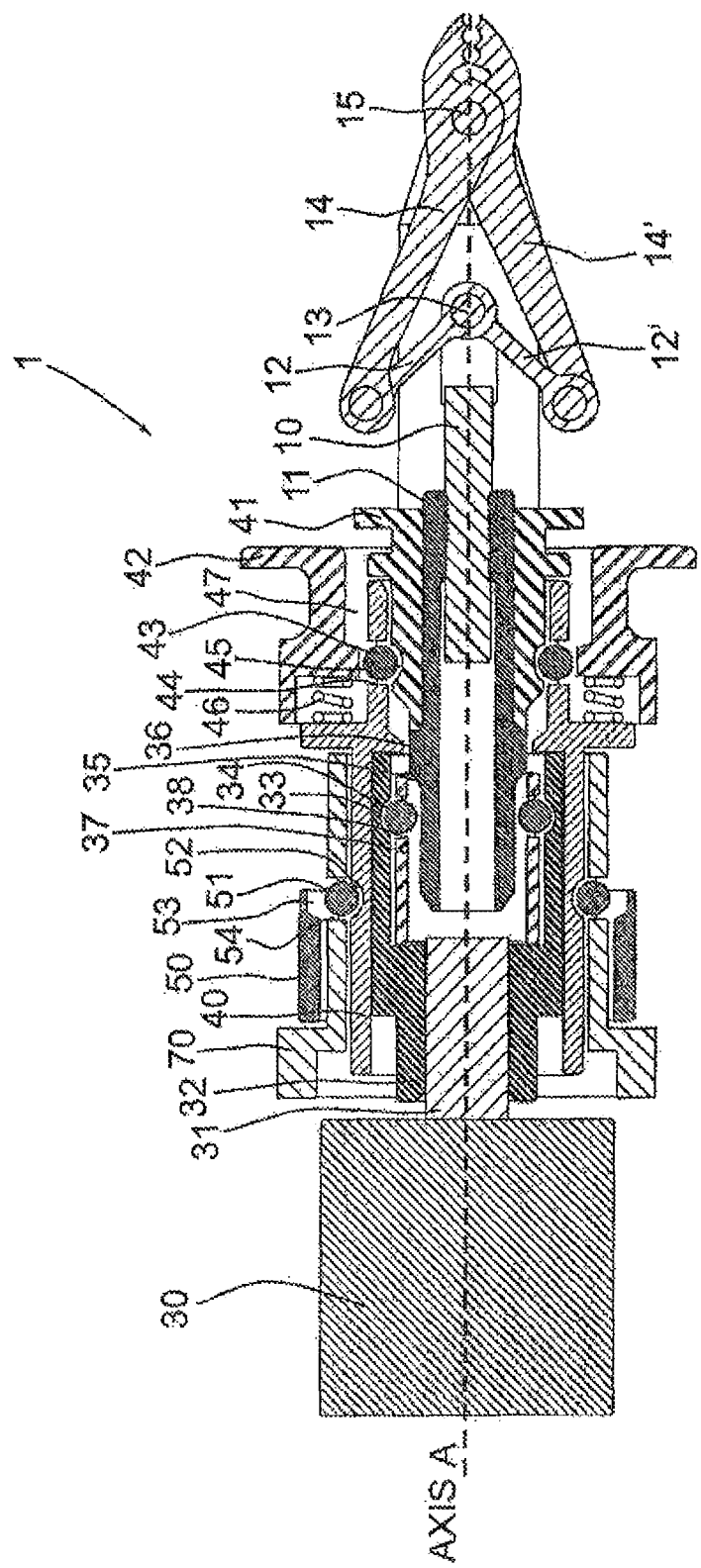
FIG. 1 shows an elevation view of a longitudinal cross-section of a multifunctional tool, showing a tool tip in a tool holder.
Figure 1A:
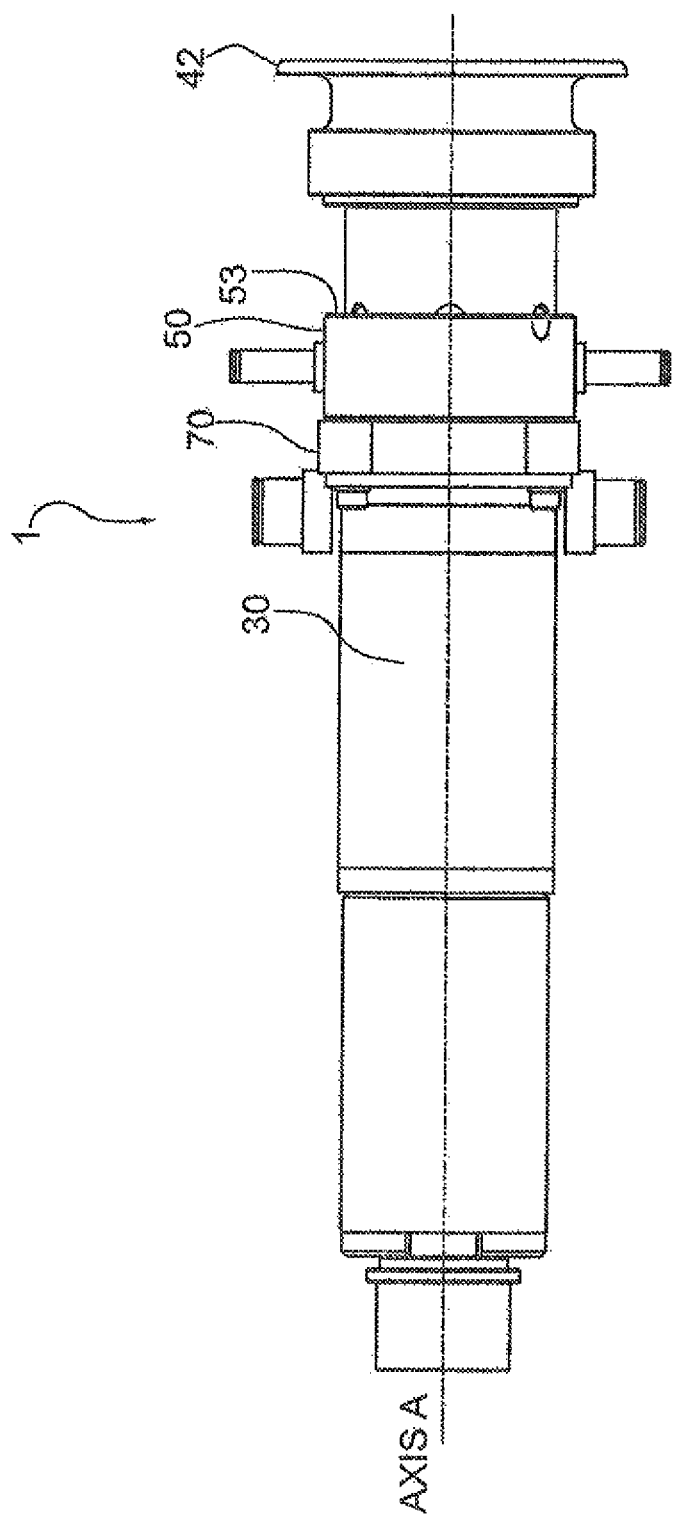
FIG. 1a is a side view of the multifunction tool of FIG. 1.
Figure 1C:
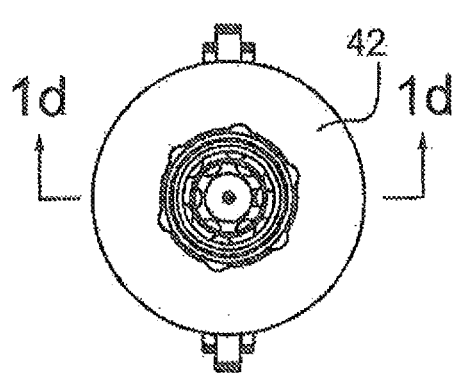
FIG. 1c is an end view of the multifunction tool of FIG. 1.
Figure 1B:
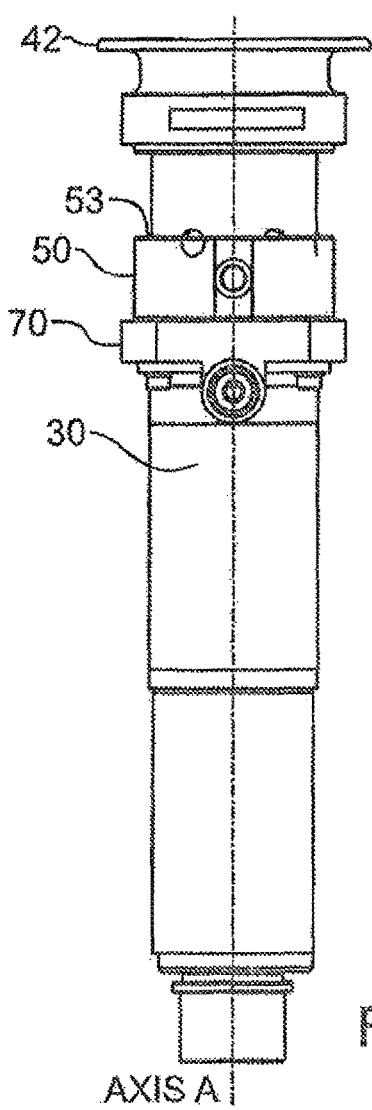
FIG. 1b is a top view of the multifunction tool of FIG. 1.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the terms "axial movement" and "axially", when used to describe movement of an object in conjunction with a defined axis, means translation of that object along a vector substantially parallel to said defined axis.

As used herein, the terms "circumferential movement" and "circumferentially", when used to describe the movement of an object in conjunction with a defined axis, means movement of said object while maintaining substantially the same distance from said defined axis without moving axially.

As used herein, the terms "radial movement" and "radially", when used to describe the movement of an object in conjunction with a defined axis, means translation of said object substantially without moving axially and substantially without moving circumferentially. The terms "inward" and "inwardly", when used in conjunction with radial movement of an object, mean radial movement such that over the course of such movement, the distance between said object and said defined axis decreases. The terms "outward" and "outwardly", when used in conjunction with radial movement of an object, mean radial movement such that over the course of such movement, the distance between said object and said defined axis increases.

As used herein, the term "orthogonal", "perpendicular", and its variants, when used in conjunction with two geometrical entities, means that an angle between the two geometrical entities is about 90°.

As used herein, the phrase "motive source" means a source of mechanical motion (e.g. a motor) and devices (e.g. as screws, mechanisms, levers, etc.) to transform the mechanical motion into other forms of desired motion (e.g. rotation, translation, scissoring motion, or combinations thereof).

Referring to FIGS. 1-4 as used herein, the direction denoted by the terms "forward", "fore", and "ahead" is along the axis A, and generally away from the motor 30, and towards an end of the tool holder 2 that accepts and holds the tool tip 3. The direction denoted by the terms "back", and "backwards" is along the axis A and away from an end of the tool holder 2 that accepts and holds the tool tip 3, and towards the motor 30. Similarly, the term "front" denotes an end of the multifunctional tool 1 that accepts and holds the tool tip 3 (shown in FIGS. 3 and 4) while the term "rear" denotes an end of the multifunctional tool 1 that is opposite to an end of the multifunctional tool 1 that accepts and holds the tool tip 3.

Figure 2:
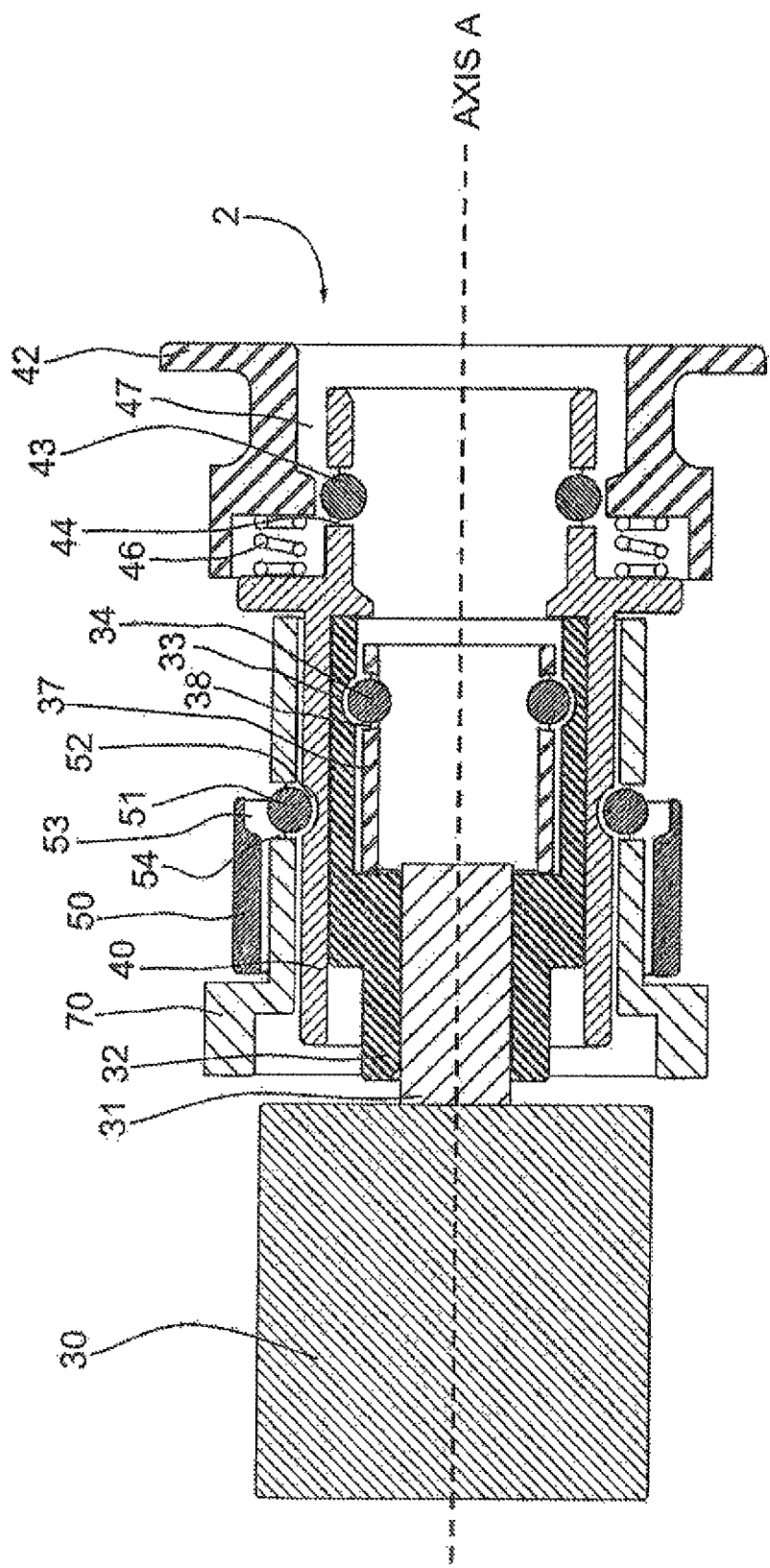
FIG. 2 shows an elevation view of a longitudinal cross-section of a multifunctional tool, showing a tool holder without a tool tip.
Figure 3:
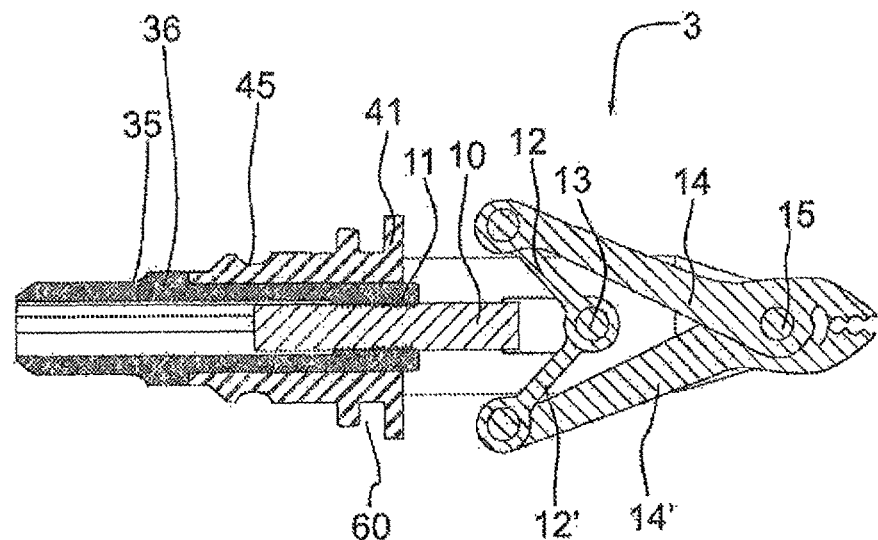
FIG. 3 shows an elevation view of a longitudinal cross-section of a tool tip for a multifunctional tool adapted to cutting wires.
Figure 4:
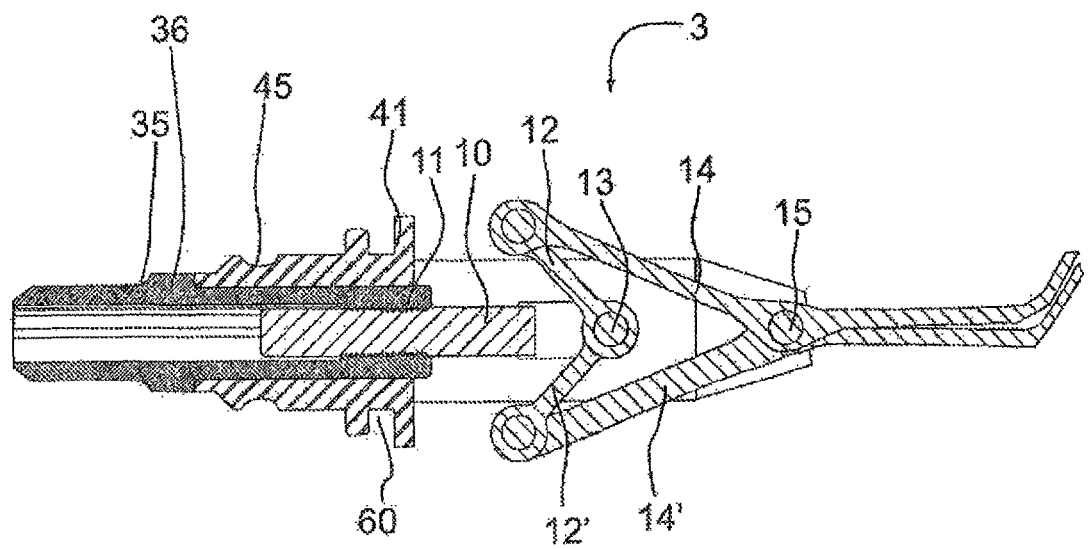
FIG. 4 shows an elevation view of a longitudinal cross-section of a tool tip for a multifunctional tool adapted to grasping thermal blankets.

The multifunctional tool 1 comprises a tool holder 2 (shown in FIGS. 1*d* and 2) and a tool tip 3 (shown in FIGS. 3 and 4). The tool holder 2 is capable of holding and driving a variety of tool tips 3, each of which may provide a different function. The end of the tool tips 3 can be variously adapted to provide a variety of functions. The tool holder 2 comprises a motive source to power the tool tip 3, and a tool tip locking mechanism to secure the tool tip 3 during operation. The locking mechanism can be engaged to secure the tool tip 3 to the tool holder 2, or disengaged to allow for the insertion or removal of the tool tip 3. The multifunctional tool 1 may also have a selector mechanism. This selector mechanism can be engaged to allow the motive source to rotate the entire tool tip 3 about axis A, in order to adjust the orientation of the tool tip 3 about axis A.

Figure 5:
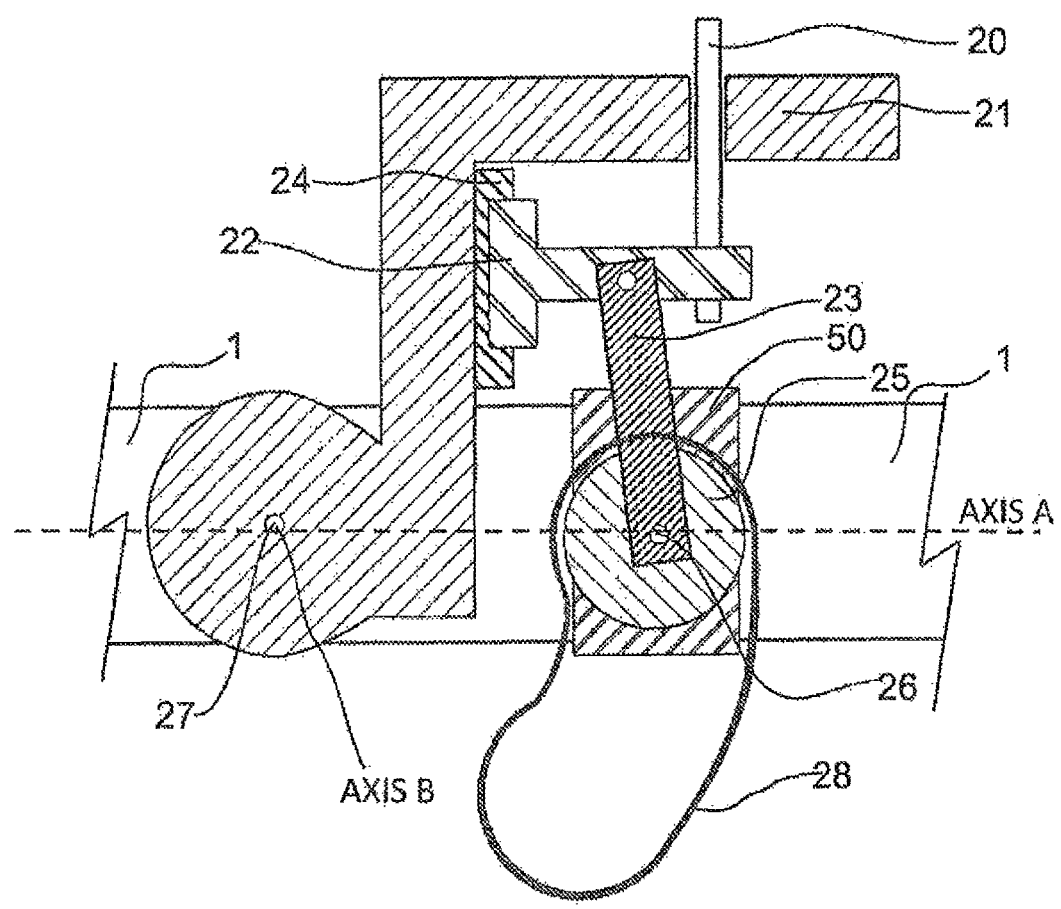
FIG. 5 shows an elevation view of a partial cutaway of a tilter mechanism forming part of the multifunction tool.
Figure 6:
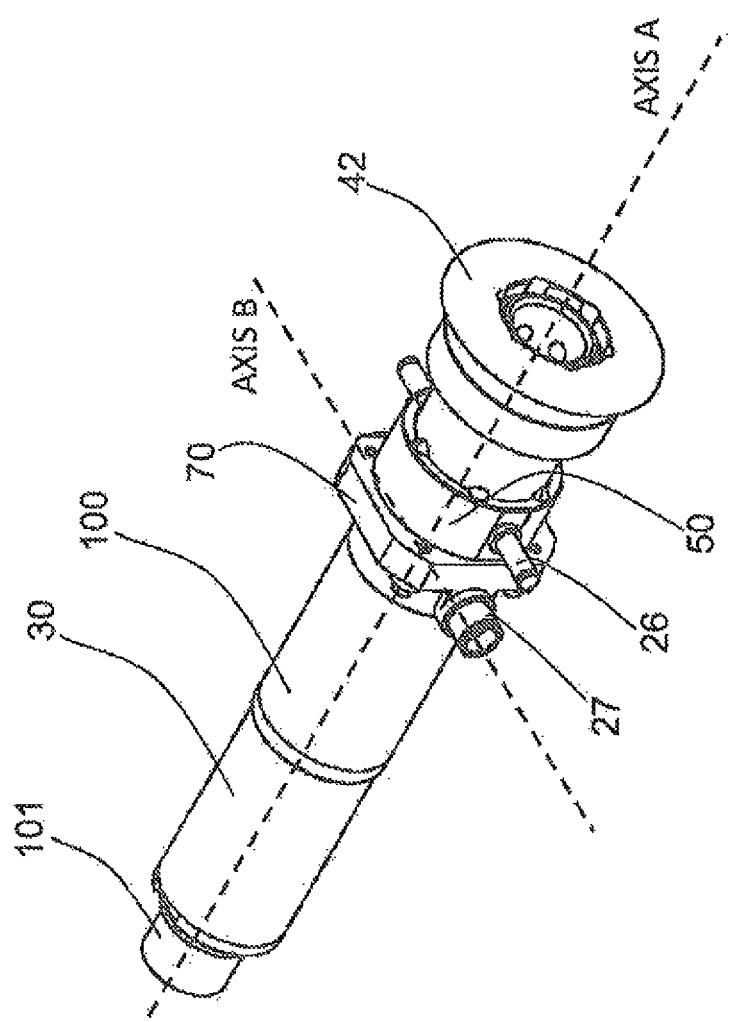
FIG. 6 shows an isometric view of a tool holder of the multifunctional tool.
Figure 8:
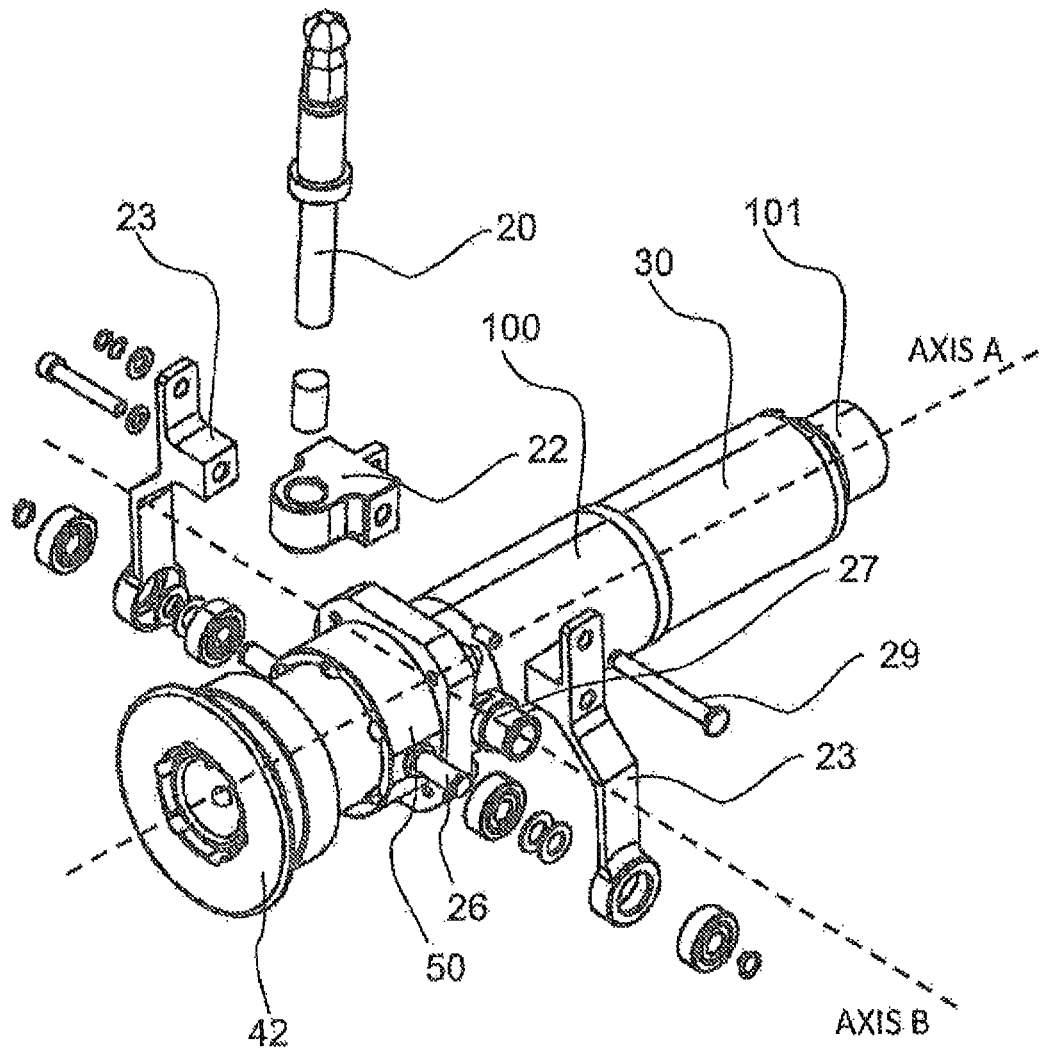
FIG. 8 shows an isometric view of a disassembly of a tilter mechanism forming part of the multifunctional tool.

In a particular embodiment, multifunctional tool 1 is provided with a tilter mechanism that allows for the rotation of the multifunctional tool 1 about an axis B, which is perpendicular to the axis A (see FIGS. 5 and 6). An exemplary tilter mechanism is shown in FIGS. 5 and 8. In another embodiment, positioning the multifunctional tool 1 in a certain orientation about axis B engages the selector mechanism, allowing the motive source to rotate the tool tip 3 about axis A. In any other orientation about axis B, the motive source actuates the tool tip 3.

Figure 7:
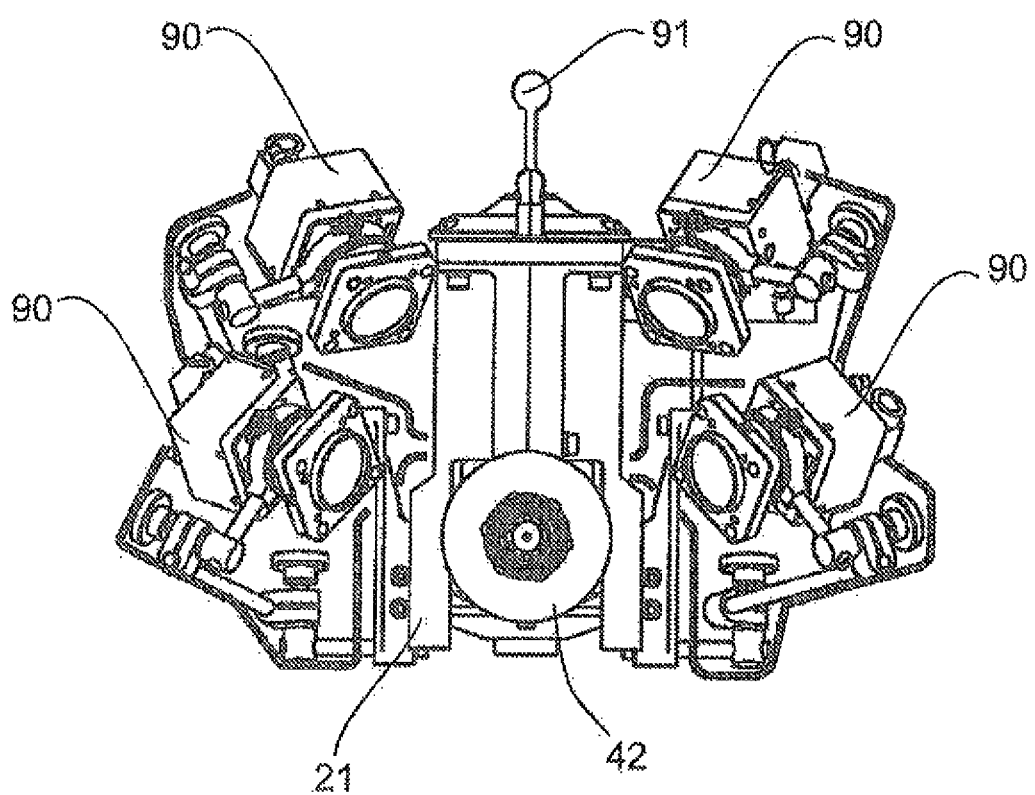
FIG. 7 shows a front view of the multifunctional tool assembled with video cameras and an electromechanical interface to a robotic arm.
Figure 7B:
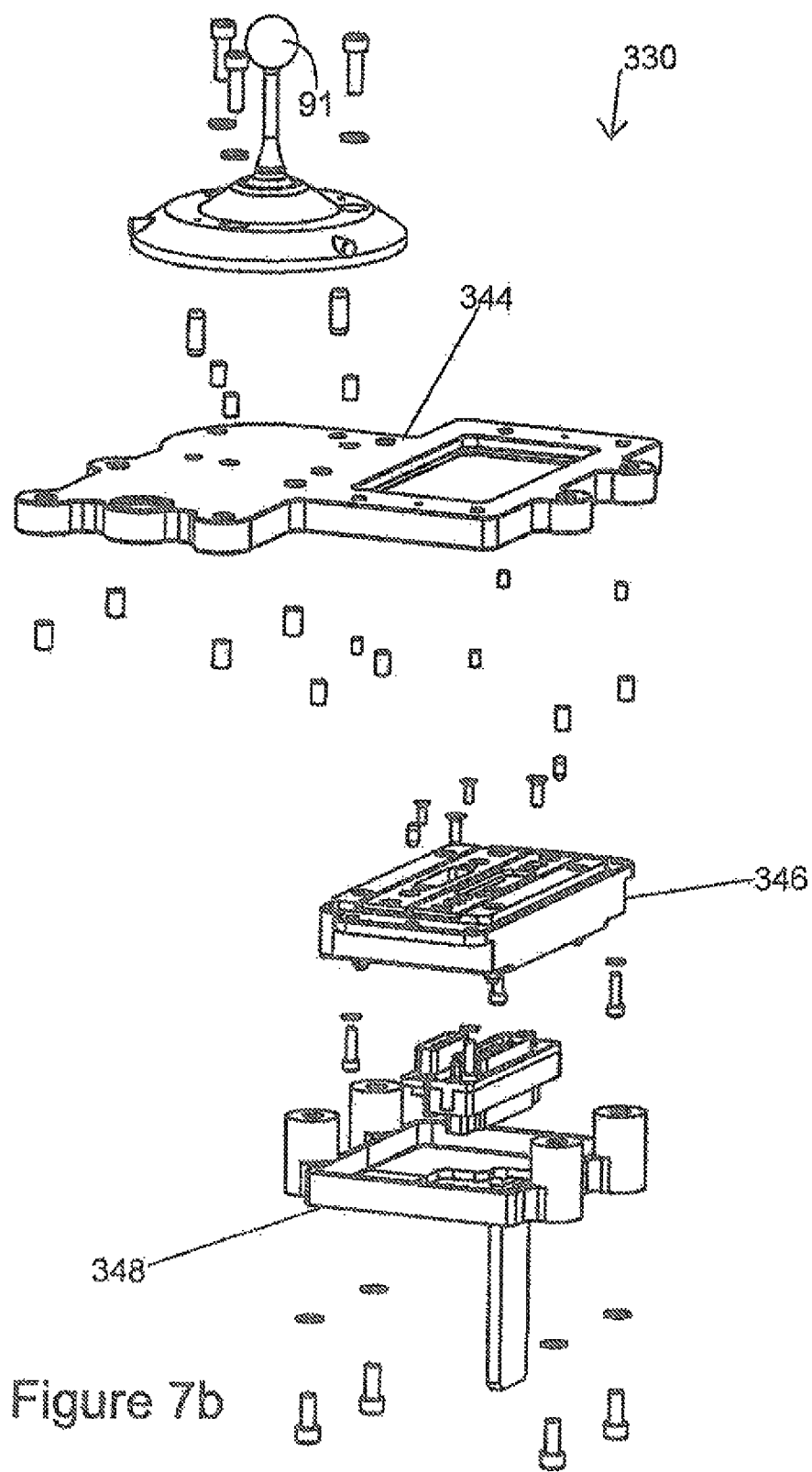
FIG. 7b shows an exploded view of the grapple fixture mechanism and components for clamping the grapple fixture mechanism to the multifunction tool.

FIGS. 7*a*, 7*b*, 7*c* and 7*d* show various exploded views of the tilter mechanism, grapple fixture and associated brackets, clamps and housings of each of these components. Specifically, FIG. 7*a* shows an exploded view of the multifunction tool showing how the various detail assemblies relate to each other. FIG. 7*b* shows an exploded view of the structural chassis assembly 330 which comprises an upper mounting plate 344, a grapple fixture 91, an electrical connector assembly 346 and an electrical connector housing 348.

Figure 7D:
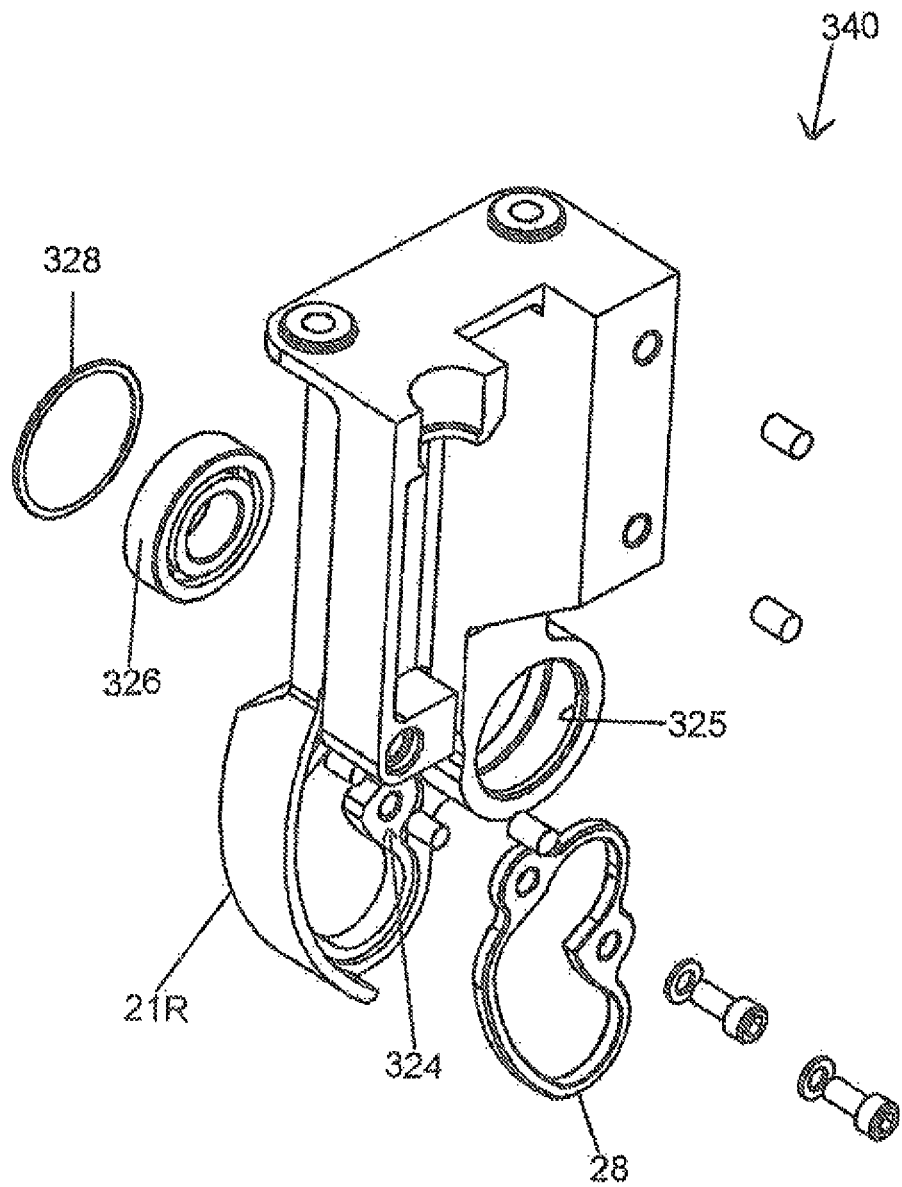

FIGS. 7*c* and 7*d* shows an exploded view of of the two halves of the tilter mechanism 340 forming part of the multifunction tool 1. Tilter mechanism 340 includes housings 21R and 21L having a cam receiving housing section 324 for receiving therein cam 28, a bearing housing section 325 for receiving a bearing 326 and bearing retainer 328. FIG. 7*c* also shows shoe 22 and shoe mounting plate 22*a* that are attached to linear bearing 24 which runs on rail 24*a*. The cam 28 controls the motion of the sliding sleeve 50 via the cam follower 25. The bearings 326 permit the multifunction tool 1 to rotate smoothly within the tilter mechanism 340 and are retained in the bearing housing section 325 by the bearing retainers 328. The linear bearing 24 runs on rail 24*a* to allow the shoe 22 to move smoothly up and down to control the tilt of the multifunction tool 1. Shoe mounting plate 22*a* structurally mounts the shoe 22 to the linear bearing 24.

Figure 1D:
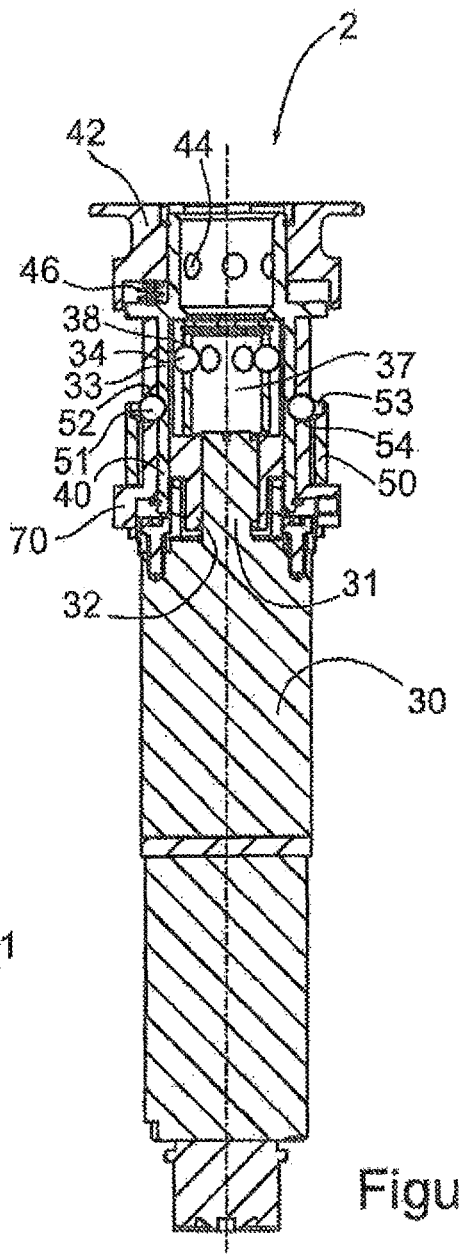
FIG. 1d is a cross section along the line 1d-1d of FIG. 1c.
Figure 1E:
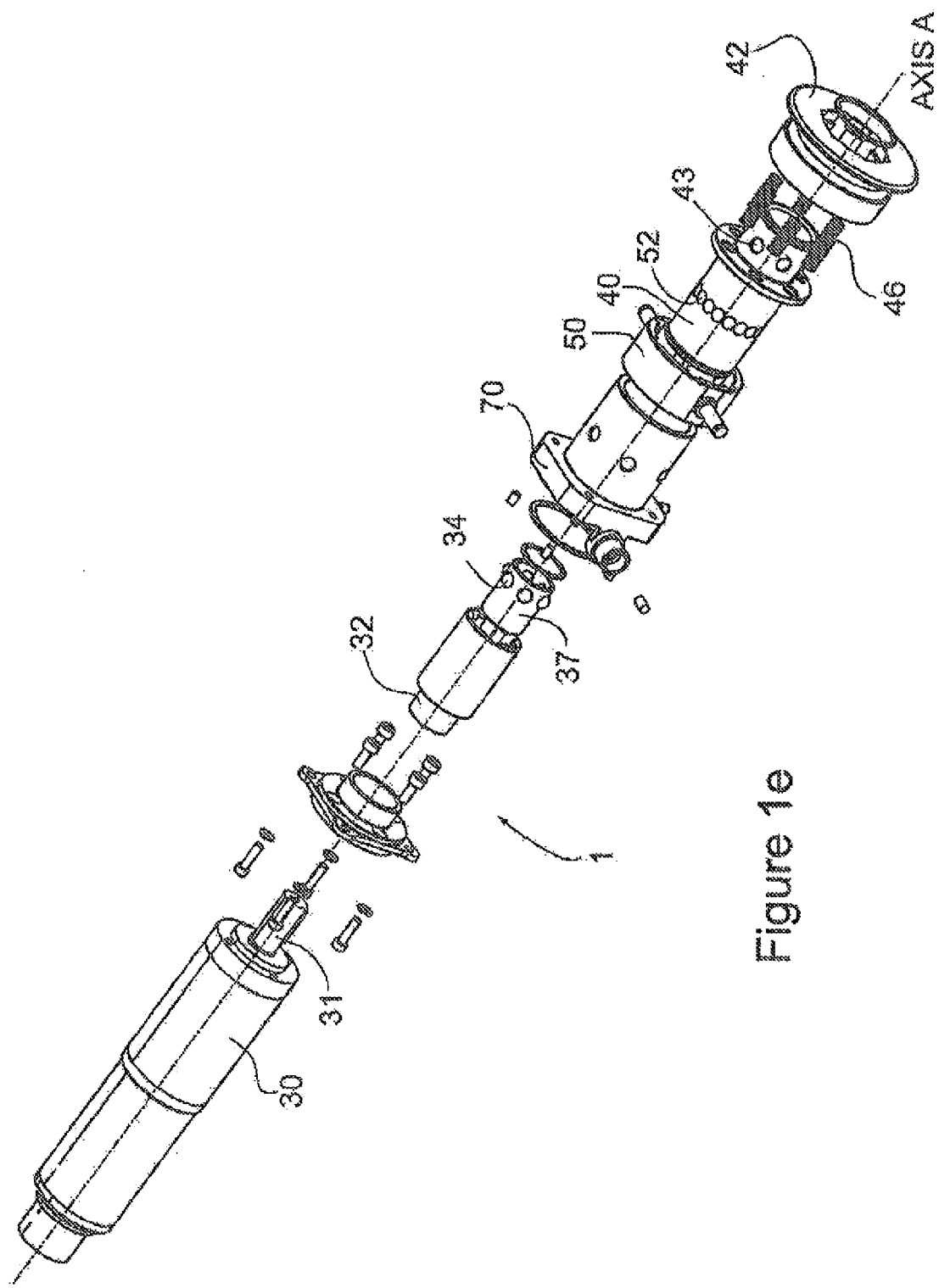
FIG. 1e is an exploded view of the multifunction tool of FIG. 1.

FIG. 1 shows a cross sectional view of a multifunctional tool 1. FIGS. 1*a* to 1*e* show different views, cross sections and an exploded view of tool 1. With reference to FIGS. 1 to 1*e*, and FIG. 2, the tool tip 3 comprises a tool tip rotor 36 and a tool tip stator 41, both of which may be disposed coaxial to an axis A. During operation of the tool tip 3, the tool tip rotor 36 rotates about axis A while the tool tip stator 41 remains substantially stationary with respect to a collet 40 on the tool holder 2. The rotor 36 is driven by the motive source and the stator 41 is held in place by the tool tip locker.

The tool tip rotor 36 is driven by a ball spline drive, which functions as follows. A motor 30 drives a motor shaft 31, to which is keyed a rotor driver 32. The motor shaft 31 and the rotor driver 32 are both disposed substantially coaxial to axis A, and rotate about axis A. The rotor driver 32 has an indentation 33 that engages a driving ball bearing 34. The driving ball bearing 34 in turn engages the side of a recess 35 on the tool tip rotor 36. Torque is transmitted from the motor shaft 31 to the rotor driver 32, and through the driving ball bearing 34, to the tool tip rotor 36. The axial and circumferential movement of the driving ball bearing 34 is restricted by an appropriately sized hole 38 in a driving ball bearing retainer 37. The recess 35 has an appropriate longitudinal slope such that the driving ball bearing 34 can easily slide into the recess 35 as the tool tip 3 is inserted axially into the tool holder 2.

A person skilled in the art will appreciate that the ball spline drive may comprise a plurality of driving ball bearings 34 and a corresponding plurality of holes 38 in the driving ball bearing retainer 37, both pluralities spaced substantially uniformly along the circumference of the tool holder 2, at substantially the same radial position. The tool tip rotor 36 of the tool tip 3 will then have a plurality of recesses 35 spaced similarly around the circumference of the tool tip rotor 36 to be able to accept the plurality of driving ball bearings 34. In a particular embodiment, the tool holder 2 is provided with six driving ball bearings 34 and six holes 38 in the driving ball bearing retainer 37 spaced substantially uniformly around the circumference of the tool holder 2, and the tool tip 3 is provided with six corresponding recesses 35.

A person skilled in the art will appreciate that the motor 30 may be a DC brushed motor, a DC brushless motor, an induction motor, or a stepper motor. There may also be a transmission placed between the motor 30 and the motor shaft 31 that transmit torques from the motor 30 to the motor shaft 31. Such a transmission may include clutches, gearboxes, or gearheads. There may also be provided one or more sensors to detect variables associated with the motor 30, such as angular position, angular velocity or angular acceleration. Such sensors may include resolvers or encoders. In a preferred embodiment shown in FIGS. 6 and 8, the motor 30 is a DC brushless motor coupled to a planetary gearhead 100 that transmits torque to the motor shaft 31, monitored by a resolver 101 that measures the angular position of the motor shaft 31.

The tool tip stator 41 is held in place by the collet 40. The axial movement of the collet 40 is restricted with respect to a tool housing 70 by protrusions attached to the housing 70 that abut against distal ends of the collet 40. The rotational movement of the collet 40 about axis A with respect to the housing 70 can be selectively restricted, by a collet locker described later. The axial movement of the entire tool tip 3 with respect to the tool holder 2 can be restricted by a tool tip locker, which functions as follows. The collet 40 has a hole 44 that holds a locking ball bearing 43. The hole 44 is appropriately shaped such that it restricts the axial, circumferential, and inwardly radial movement of the locking ball bearing 43. However, the hole 44 permits outwardly radial movement of the locking ball bearing 43. In its most inwardly radial position (as permitted by the hole 44), the locking ball bearing 43 engages an indentation 45 on the tool stator 41. The locking ball bearing 43 is held in its most inwardly radial position, engaged to the indentation 45, by an axially translatable spring-loaded locking sleeve 42, which is biased forwards by a spring 46. The indentation 45 is arranged such that when the locking ball bearing 43 is engaged therein, translation along all axes of the locking ball bearing 43 with respect to the tool stator 41 is restricted, thus locking the tool tip 3 to the tool holder 2. The same locking mechanism, when engaged, also restricts the rotational movement about axis A of the tool rotor 41 with respect to the collet 40 due to the ball bearing 43 in hole 44. A person skilled in the art will appreciate that the locking mechanism may comprise a plurality of locking ball bearings 43 spaced substantially uniformly along the circumference of the multifunctional tool 1, in which case the collet 40 will have a corresponding number of similarly spaced holes 44, and the tool tip stator 41 will have a plurality of indentations 45. A person skilled in the art will also appreciate that the number of indentations 45 may be larger than the number of locking ball bearings 43. In a particular embodiment, there are six locking ball bearings 43 spaced uniformly along the circumference of the multifunctional tool 1, the collet 40 has six holes 44, and the tool tip stator 41 has twelve indentations 45. This allows for the tool tip stator 41 to be locked to the collet 40 in a number of discrete rotational orientations. As such, the tool tip 3 can be in a variety of orientations when being inserted into the tool holder 2, and can tolerate variance in the orientation of the tool tip 3 during tool tip insertion. A person skilled in the art will also appreciate that there may be provided a plurality of springs 46 to bias the locking sleeve 42 forward. In a particular embodiment, there are six springs 46. These springs may be coil springs.

Figure 11:
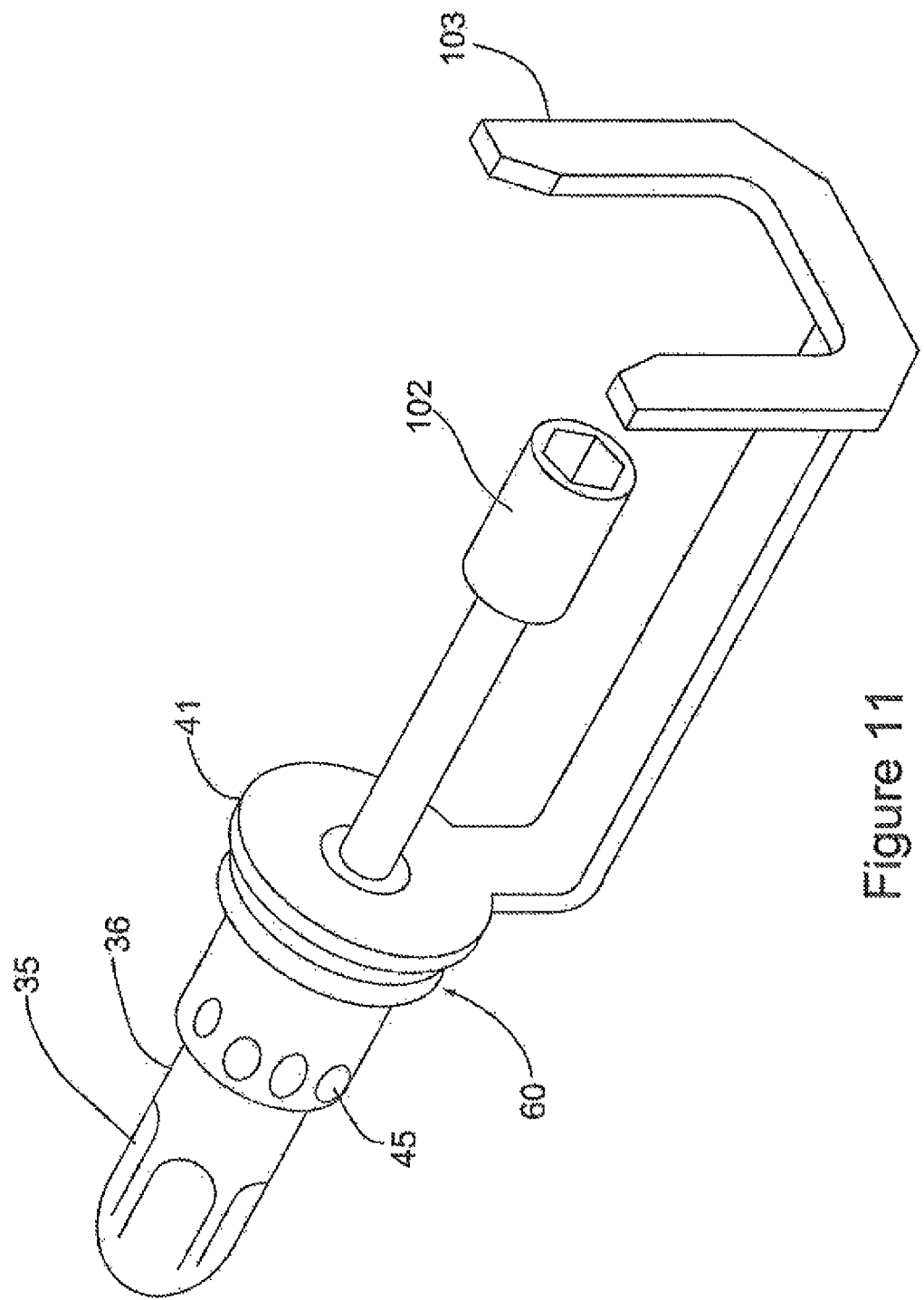
FIG. 11 shows an isometric view of a tool tip for a multifunctional tool configured to include a hex socket, and a clamp to locally react torques produced by the action of the hex socket.

The working end of the tool tip rotor 36 may be variously adapted to perform a variety of functions. For example, it may comprise one of a variety of rotational bits such as drills, sockets, screwdrivers, etc. The tool tip 3 may be used to fasten and unfasten a variety of rotational fasteners including slotted and Phillips screws, internal and external hex screws, ¼ turn fasteners. A particular embodiment shown in FIG. 11 comprises a hex socket 102 attached directly to the tool tip rotor 36. The embodiment in FIG. 11 also includes a clamp 103 attached to the locking sleeve 42 for locally reacting torques produced by the action of rotational bits such as the hex socket 102. The clamp 103 grounds the multifunctional tool 1 to whatever object the multifunctional tool 1 is acting upon.

The tool tip 3 may be adapted to transform the rotational motion of the tool tip rotor 36 into other forms of motion. For example, the tool tip 3 in FIGS. 1, 3 and 4 has been adapted to transform the rotational motion of the tool tip rotor 36 about axis A into linear motion of a pushrod 10 by means of a screw assembly. The interior of the tool tip rotor 36 is hollow, and the inside surface of the tool tip rotor 36 is threaded such that the thread engages a screw 11 on the pushrod 10. As the tool tip rotor 36 rotates, the screw mechanism 11 converts the rotational motion of the tool tip rotor 36 into linear motion of the pushrod 10. The pushrod 10 may be further coupled to other mechanical devices for transforming the linear motion of the pushrod 10 into other kinds of motions and performing a variety of mechanical actions, such as cutting, grasping, gripping, etc. In a set of embodiments, the pushrod 10 is coupled to a lever tool. Such a lever tool may be, for example, pliers, scissors, cutters, grippers, or handlers.

Figure 12:
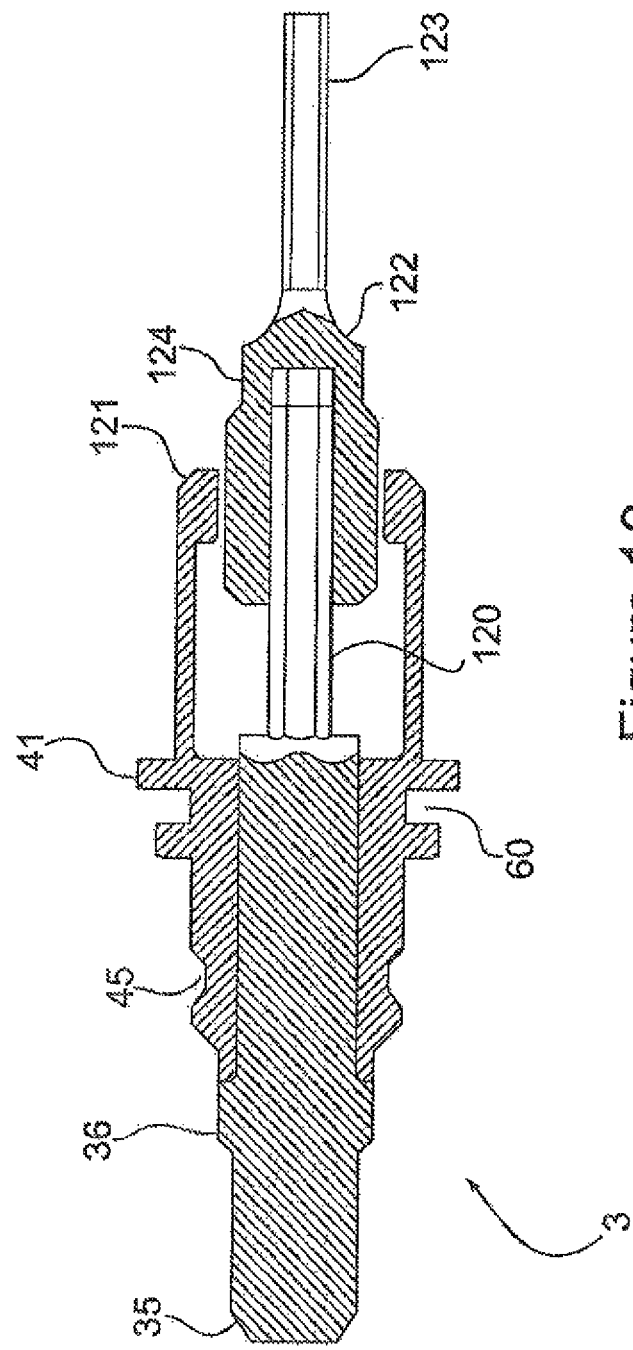
FIG. 12 shows an elevation view of a longitudinal cross-section of a tool tip for a multifunctional tool configured to include a hex key driver capable of rotation and translation.

FIG. 12 shows an embodiment of a tool tip 3 configured to transform the actuation of the motive source into both rotation and translation of the hex driver 123. The rate at which the hex key 123 advances or retracts can be tuned by modifying the pitch of the translating threads 124 between the translating socket 122 and the stationary collar 121. The power may be transmitted from the socket drive 120 to the translating socket 122 by any number of means, e.g. spline, hex drive, square drive, sliding Woodruff key, etc.

FIGS. 1 and 3 shows an example of a tool tip 3 that has a lever tool adapted to cut wires. The tool tip 3 has been adapted to transform the rotational motion of the tool tip rotor 36 into linear motion of the push rod 10. The tool tip 3 in FIGS. 3 and 4 comprises a series of mechanical linkages to transform the linear motion of the pushrod 10 into a scissoring motion of two members 14 and 14' about a pivot 15, which operates about an axis perpendicular to the axis A. The pivot 15 may be implemented a pin that passes through the two members 14 and 14', as well as a member that is affixed to the tool tip stator 41. As the pushrod 10 translates forwards, the mechanical linkages 12 and 12' rotate about the pivot 13, which rotates the members 14 and 14' about the pivot 15. The ends of the members 14 and 14' may be variously adapted to perform a variety of functions. In the embodiment shown in FIG. 3, the ends of the members 14 and 14' are serrated blades, adapted for cutting wires. In other applications, these may be replaced with any number of end tools that require a scissoring motion about a common pivot such as wire cutters, grasping members, pliers, pincers, scissors, etc. The tool tip 3 may be used to perform any one of the following tasks: cutting electrical wire, thermal blankets, lock wire, and metals; gripping; clamping; and operating buttons, thermal blankets, latches, and handles. The tool tip 3 may also be adapted to strip and dispose of wire insulation, remove and dispose of fastener safety caps, apply adhesive tapes, suture thermal blankets together, or be used as a pry bar. The tool tip 3 may be equipped with expanding jaws for prying apart material, or be used as a nut splitter. FIG. 4 shows a tool tip 3 wherein the ends of the members 14 and 14' are flat and elongate, and adapted for grasping material. A particular embodiment has the ends of the members 14 and 14' adapted to grasping thermal blankets.

Tool tips 3 that have a levering tool generally operate about an axis perpendicular to axis A, which is fixed with respect to the tool tip stator 41. In order to change the axis about which such tools operate, the tool tip 3 can be rotated about one or more of (i) axis A and (ii) axis B, which is substantially perpendicular to axis A as shown in FIGS. 5 and 8.

To achieve rotation of the tool tip 3 about axis B, the entire multifunctional tool 1 can be tilted about axis B using the following mechanism, shown in FIG. 5. The multifunctional tool 1 is rotatably attached to housing sections 21R and 21L using a pivot 27 disposed substantially coaxial to axis B. To the housing 21L is affixed a linear bearing 24. On the linear bearing 24 is provided a shoe 22, which is translatably actuatable along the linear bearing 24. Such actuation is provided by the rotation of a shaft 20 about its longitudinal axis. A suitable transmission system can be provided within the shoe 22 that transforms the rotational motion of the shaft 20 into linear motion of the shoe 22 along the linear bearing 24. Such transmission systems are known in the art, and may include a worm gear engaged to a rack-and-pinion assembly.

Suitable actuators may be used to drive the rotation of the shaft 20. Such actuators may include DC brushed motors, DC brushless motors, AC motors or stepper motors. Such actuators may also include suitable a transmission to transmit torque from the motor to the shaft 20, and suitable sensors to measure the angular position or velocity of the rotational shaft 20. In a particular embodiment, such actuators comprise a DC brushless motor coupled to a gearbox, monitored by a resolver. To the shoe 22 is rotatably attached a yoke 23 using a pivot 29. The pivot 29 allows rotation of the yoke 23 about an axis that is substantially parallel to axis B.

The yoke 23 is rotatably attached to a sliding sleeve 50 through a pivot 26. The pivot 26 allows rotation of the yoke 23 with respect to the sliding sleeve 50 about an axis substantially parallel to axis B. The sliding sleeve 50 is linearly translatable along the body of the multifunctional tool 1. Also rotatably attached to the yoke 23 about the pivot 26 is a cam follower 25, which can move along cams 28 affixed to the housings 21R and 21L. Rotation of the shaft 20 causes the shoe 22 to translate along the linear bearing 24. The movement of the shoe 22 urges the yoke 23 to rotate about the pivot 29, and move the cam follower 25 along the cam 28. The cam 28 is shaped such that motion of the cam follower 25 along the cam 28 causes the sliding sleeve 50 to translate along the body of the multifunctional tool 1. Since the yoke 23 is rotatably attached to both the shoe 22 at pivot 29 and to the sliding sleeve 50 at pivot 26, such motion results in the rotation of the multifunctional tool 1 about axis B. Note that such rotation results in the re-orientation of axis A, which remains fixed to the motor 30.

Referring again to FIG. 1, the sliding sleeve 50 also is a part of a collet locker that locks and unlocks the collet 40 to a tool housing 70 that is affixed to the motor 30. When the collet 40 is locked to the tool housing 70, the motor 30 drives the tool tip 3 as discussed above. When the collet 40 is unlocked from the tool housing 70, it is freely rotatable with respect to the tool housing 70 and can be rotated about axis A by the motive source in the following manner. The collet 40 is unlocked from the tool housing 70, and the motive source drives the tool tip rotor 36, as described above, until the lever tool reaches an extent of its movement and the pushrod 10 cannot be translated further forward. Thus, the tool tip rotor 36 is locked to the tool tip stator 41. Any further actuation by the motive source results in rotation of the entire tool tip 3 about axis A, including the tool tip stator 41, as well as the collet 40 (which may be engaged to the tool tip stator 41). The selective locking of the collet 40 to the tool housing 70 is achieved using a mechanism similar to the locking mechanism used to hold the tool tip stator 41 connected to the collet 40, as described above. The collet locker works in the following manner. A collet-locking ball bearing 51, shown in FIGS. 1 and 2 has its axial, circumferential, and inwardly radial movement restricted by a hole 54 in the tool housing 70. In its most inwardly radial position, the collet-locking ball bearing 51 engages an indentation 52 in the collet 40, restricting the rotational movement about axis A of the collet 40 with respect to the tool housing 70. When in a certain range of positions along the multifunctional tool 1, the sliding sleeve 50 holds the collet bearing 51 in its most inwardly radial position, engaged to the indentation 52, thus locking the collet 40 to the tool housing 70. Since each position of the sliding sleeve 50 along the multifunctional tool 1 corresponds to an angular position of the multifunctional tool 1 about axis B, there is a certain range of orientations of the multifunctional tool 1 about axis B in which the collet 40 is held substantially affixed to the tool housing 70. When the multifunctional tool 1 is not within this certain range, the collet 40 is rotationally uncoupled (unlocked) from the tool housing 70: a recess 53 in the sliding sleeve 50 allows the collet-locking ball bearing 51 to become disengaged from the indentation 52 in the collet 40, allowing the collet 40 to rotate about axis A independent of the tool housing 70.

Thus, when the multifunctional tool 1 is in a certain position about axis B, the motor 30 is capable of driving the rotation of the tool tip collet 40 (and all other parts that are affixed to tool tip collet 40 at that point in time, which may include the tool tip 3).

The tool tip 3 is insertable into and removable from the tool holder 2. The tool tip 3 is inserted into the tool holder 2 as follows. The locking sleeve 42 is translated backwards with respect to the tool tip collet 40, creating a space 47. This may be performed by the robotic arm pushing sleeve 42 against another object. As the tool tip 3 is inserted into the tool holder 2, the tool tip stator 41 moves the locking ball bearing 43 into the space 47, and the sloped end of the recess 35 of the tool tip rotor 36 accepts the driving ball bearing 34. The axial movement of the tool tip 3 is continued until the locking ball bearing 43 is aligned with the indentation 45 in the tool tip stator 41. At this point in time, the locking sleeve 42 is allowed to translate axially forward through the action of the spring 46, thus engaging the locking ball bearing 43 into the indentation 45 (as described above) and locking the tool tip 3 to the tool tip collet 40.

The reverse process is carried out to remove the tool tip 3 from the tool holder 2. The locking sleeve 42 is translated axially backwards, creating a space 47. This may be performed by the robotic arm pushing sleeve 42 against another object. As the tool tip 3 is moved axially forwards, the tool tip stator 41 moves the locking ball bearing 43 into this space 47, disengaging the locking ball bearing 43 from the indentation 45. This allows for the entire tool tip 3 to be removed from the tool holder 2 by moving it axially forwards.

Figure 9:
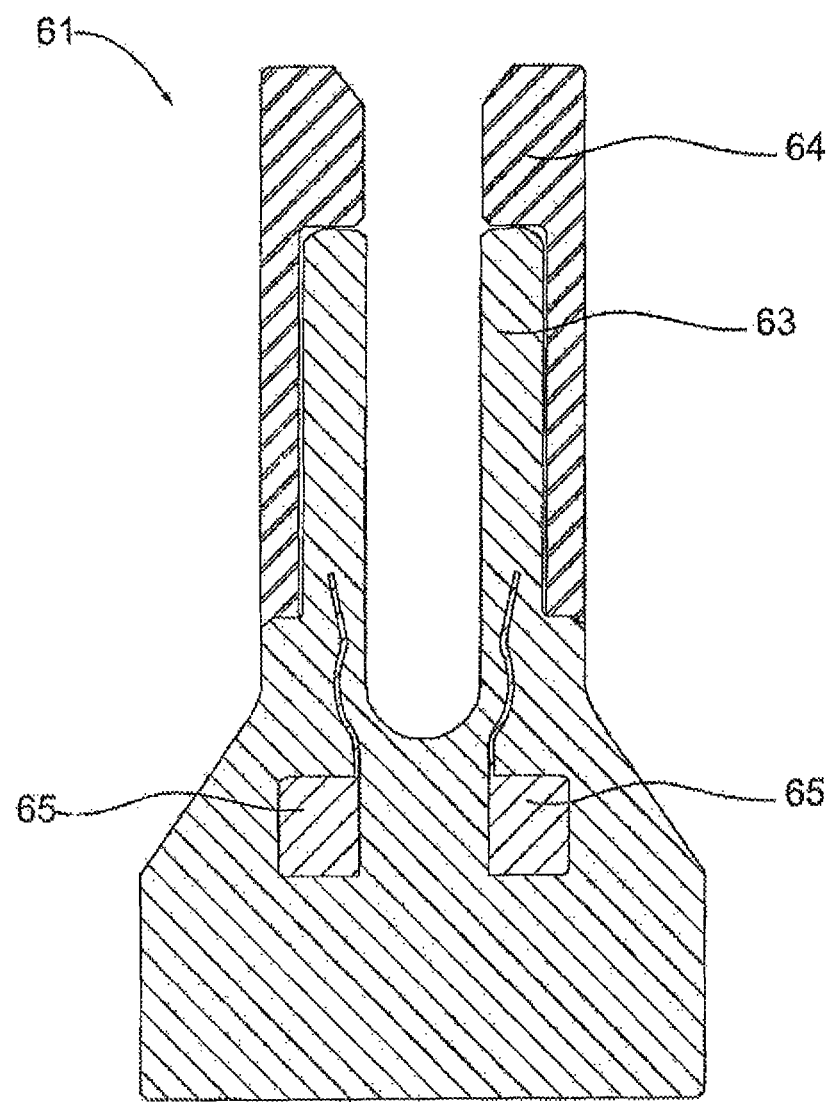
FIG. 9 shows a front view of a tool clip for holding a tool tip.
Figure 10:
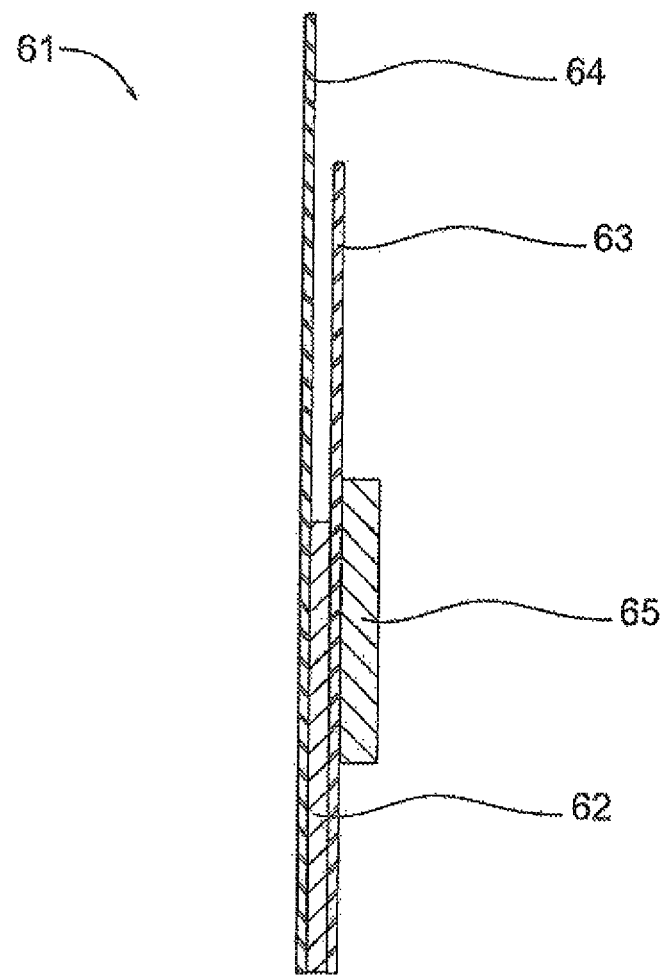
FIG. 10 shows a side view of a tool clip for holding a tool tip.

A variety of means may be employed to insert and remove the tool tip 3 from the tool holder 2. FIGS. 9 and 10 shows an example of a tool clip 61 that includes structures to assist in the insertion and removal of the tool tip 3 from the tool holder 2, and also stores tool tips 3 when they are not engaged to the tool holder 2. To remove the tool tip 3, the tool tip 3 is slotted into the tool clip 61. As the tool tip 3 is slotted into the tool clip 61, a groove 60 on the tool tip stator 41 engages a retainer 63 on the tool clip 61. The tool tip 3 is moved along the tool clip 61, and a spacer 62 engenders a separation between the retainer 63 (to which the tool tip 3 is engaged) and a push plate 64. This separation causes the push plate 64 to push against the locking sleeve 42, pushing it backwards, and unlocking the tool tip 3 from the tool holder 2 as described above. As the multifunctional tool 1 is translated axially away from the tool clip 61, the groove 60 on the tool tip 3 remains engaged to the retainer 63, holding the tool tip 3 in the tool clip 61 while the tool tip 3 slides out of the tool holder 2. The tool clip 61 is provided with a spring tab 65 to grasp and hold the tool tip 3 securely in place. The tool tip 3 remains in the tool clip 61 until it is required again.

The process of inserting a tool tip 3 being held by a tool clip 61 into the tool holder 2 is as follows. The tool holder 2 approaches the tool tip 3 from the rear, and the tool tip 3 is slid into the tool holder 2. As the locking sleeve 42 contacts the push plate 64, the locking sleeve 42 is translated axially backwards with respect to the tool tip collet 40, opening up a space 47. The locking ball bearing 43 is moved into that space 47 by the tool tip stator 41 as the tool tip 3 is slid further into the tool holder 2. The multifunctional tool 1 is moved along the tool clip 61 and away from the spacer 62, and the separation between the retainer 63 and the push plate 64 decreases. This allows the locking sleeve 42 to translate axially forwards with respect to the tool tip collet 40, locking the tool tip 3 in the tool holder 2 as described above.

In a particular embodiment, there is provided a tool caddy comprising a plurality of tool clips 61, each holding a distinct tool tip 3 arranged in close proximity. The tool holder 2 may be connected to a robotic arm, and act as an end-effector for the robotic arm. The necessary movement of the tool holder 2 in order to insert or remove tool tips 3 may be achieved by actuating the robotic arm. In such an embodiment, the robotic arm would be able to pick up a tool tip 3 from a tool caddy by inserting it into the tool holder 2, perform a task with the tool tip 3, return the tool tip 3 to the caddy, and pick up one or more additional tool tip 3 from the tool caddy in order to perform a second task. Such a system would be highly advantageous since it would allow a single robotic arm with a single end-effector (i.e. the tool holder 2) and a single drive system to perform a variety of tasks by using a appropriate tool tips 3.

Figure 13:
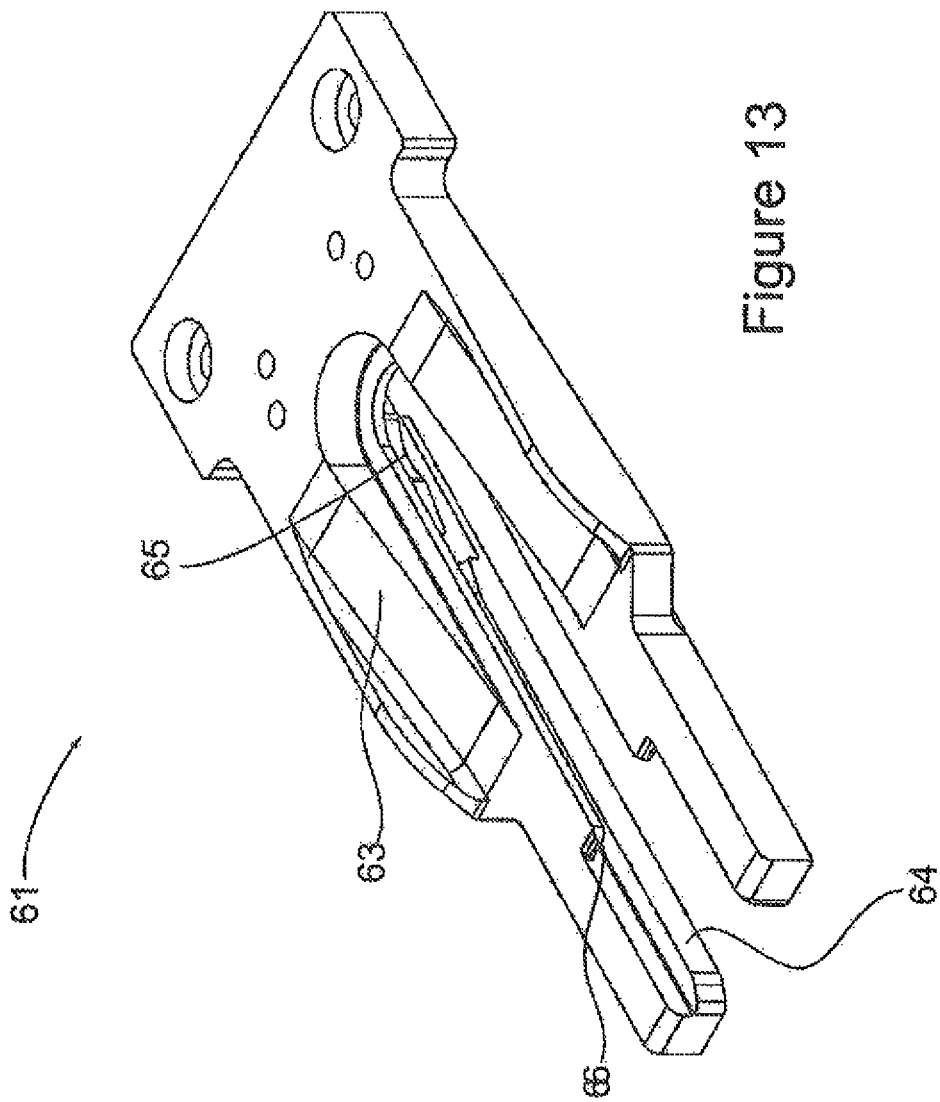
FIG. 13 shows an alternative embodiment of the tool clip for holding a tool tip.

FIG. 13 shows an alternative embodiment to the tool tip clip of FIGS. 9 and 10. In this embodiment, the pusher plate 64 and the retainer 63 are integrally formed to produce one piece. During insertion of the tool tip 3, the tool tip 3 locks into a slot 66. Instead of the spacer 62 in FIGS. 9 and 10, the retainer 63 has a wedge shape that compresses the locking sleeve 42 backwards. This embodiment also comprises a spring tab 65 that holds and retains the tool tip 3. The steps required for the insertion and removal of a tool tip 3 from this tool tip clip 61 are the same as described above for the embodiment shown in FIGS. 9 and 10.

The multifunctional tool may also be provided with a vision system which may include one or more of imagers that capture a view of the operations of the multifunctional tool 1. Such imagers may comprise video cameras, still cameras, and stereoscopic cameras. FIG. 7 shows a multifunctional tool 1 outfitted with four video cameras 90 which constitute a vision system. It is noted the vision system may have more or less cameras than four (4) and may use alternatively, or additionally other types of sensors to give the same information. The imagery captured by such imagers may be transmitted to a human operator or to a computer-controlled guidance-and-control system. The imagers may be rigidly attached to the housings 21. In a particular embodiment, the imagers comprise four cameras mounted to the multifunctional tool 1 using yoke 350.

FIG. 7a shows a partial exploded view of the assembly of FIG. 7 absent the video cameras on the left hand side of the FIG. 7a. In this embodiment, yoke 350 is used to support the cameras 90 and provide a stable location to support the multipurpose tool 1 on the spacecraft 110 via an interface socket 351.

FIG. 7b shows an exploded view of the structural chassis assembly 330 which comprises upper mounting plate 344, a grapple fixture 91, an electrical connector assembly 346, and an electrical connector housing 348. The upper mounting plate 344 provides the structural chassis for the tool 1 to which the grapple fixture 91 is bolted to allow structural loads to be passed from the tool work site through the robotic arm 111 to the servicing spacecraft or satellite 110. The electrical connector assembly 346 holds the electrical and video connectors necessary to pass signals and data to and from the control system 425 in the spacecraft 110 to the tool motor 30 and the cameras 90. The connectors are designed to permit robotic engagement to mating connectors on the end effector 112. The electrical connector housing 348 provides a mechanical shield for the electrical connector assembly 346 and the wires the exit from it.

One application of the multifunctional tool 1 is in the field of space robotics. In a particular embodiment, the multifunctional tool 1 is provided with a mechanical and an electrical interface where a robotic arm may make a mechanical attachment and an electrical attachment, respectively. Such interfaces may be affixed to the upper mounting plate 344. The mechanical interface 91 would allow the multifunctional tool 1 to be releasably affixed to an end of a robotic arm, and the electrical interface 346 would allow the multifunctional tool 1 to receive power and control signals, and to output telemetry and video data. Such mechanical interfaces are known in the art, and may comprise a graspable member rigidly attached to the upper mounting plate 344, wherein an end of the robotic arm (end effector) 112 can grasp said graspable member. Electrical interfaces for use herein are also known in the art, and may comprise a socket assembly 346 to which can be attached a corresponding plug at an end of the robotic arm. In a particular embodiment, the mechanical and electrical interfaces are placed in close proximity, forming a combined electromechanical interface for attaching to an end-effector of a robotic arm. In another embodiment, such a robotic arm is attached to a spacecraft, and is operable is space. FIG. 7 shows a multifunctional tool with a grapple fixture 91 that can be used by a robotic arm to grasp the multifunctional tool.

Figure 14:
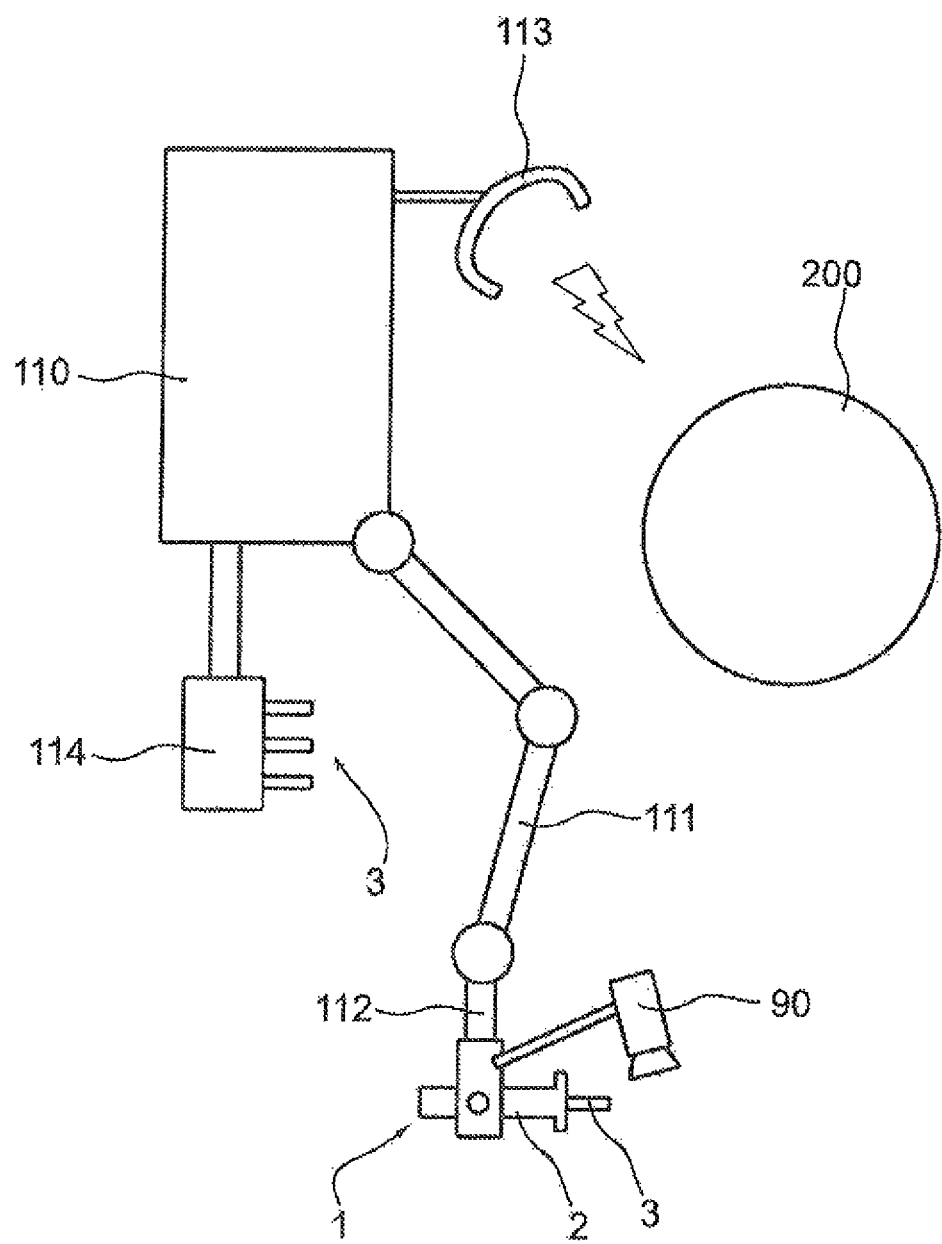
FIG. 14 shows a sketch of the multifunctional tool attached to a robotic arm. Also shown is a vision system to monitor the movements and activities of the multifunctional tool. The robotic arm is attached to a spacecraft that is in communication with the Earth.

Thus, as depicted in FIG. 14, the multifunction tool disclosed herein may form part of a system for remote robotic servicing located on a spacecraft or satellite 110 which comprises a vision system, a robotic arm 111 having an end-effector 112, a multifunction tool 1 configured to be releasably grasped by the end-effector 112. The multifunction tool 1 comprising tool holder 2 is configured to releasably grasp a plurality of tool tips 3, and the multifunction tool 1 includes a motive source configured to activate the tool tip 3 when the motive source is activated.

Figure 15:
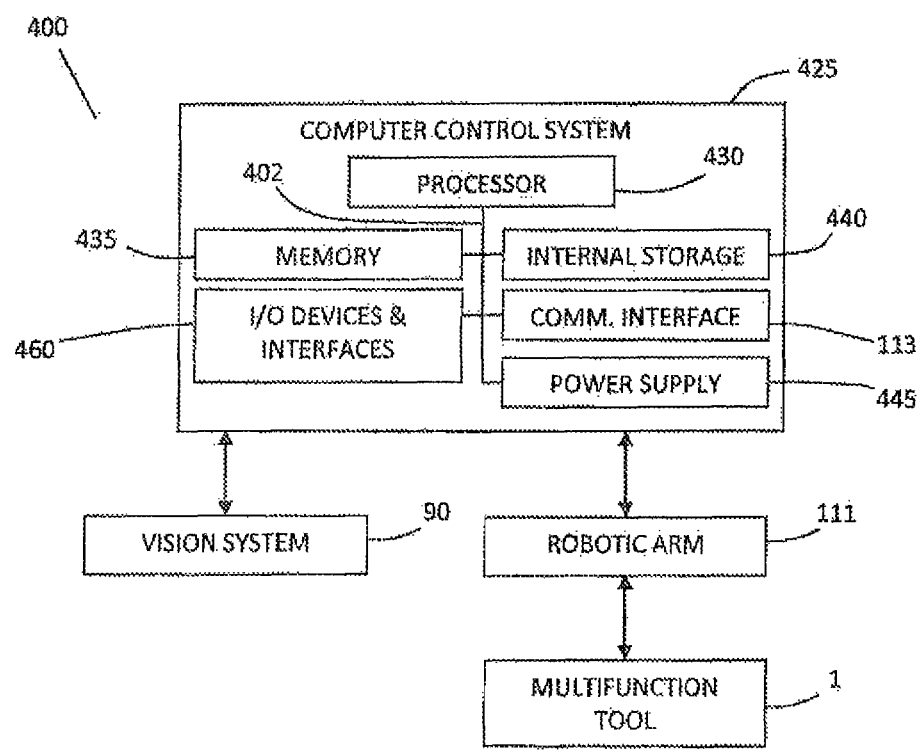
FIG. 15 shows an exemplary, non-limiting computer control system forming part of the system disclosed herein.

Referring now to FIGS. 14 and 15, an example computing system for performing the aforementioned methods is illustrated. The system includes a computer control system 425 configured, and programmed to control movement of the robotic arm 111 and the motive source of the multifunction tool 1. Computer control system 425 is interfaced with vision system 90, and robotic arm 111. A communication system 113 is provided which is interfaced with the robotic arm 111 and configured to allow remote operation (from the Earth 200 or from any other suitable location) of the vision system (which may include one or more cameras 90), the robotic arm 111 and the multifunction tool 1. A system of this type is very advantageous particularly for space based systems needing remote control. By providing a suite of tool tips 3 in a tool caddy 114 that are configured to be activated by a single motive source on the multifunction tool 1 such that they do not need their own power sources provides an enormous saving in weight which is a premium on every launch.

Some aspects of the present disclosure can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version. Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

FIG. 15 provides an exemplary, non-limiting implementation of computer control system 425, which includes one or more processors 430 (for example, a CPU/microprocessor), bus 402, memory 435, which may include random access memory (RAM) and/or read only memory (ROM), one or more internal storage devices 440 (e.g. a hard disk drive, compact disk drive or internal flash memory), a power supply 445, one more communications interfaces 113, and various input/output devices and/or interfaces 455.

Although only one of each component is illustrated in FIG. 15, any number of each component can be included computer control system 425. For example, a computer typically contains a number of different data storage media. Furthermore, although bus 402 is depicted as a single connection between all of the components, it will be appreciated that the bus 402 may represent one or more circuits, devices or communication channels which link two or more of the components. For example, in personal computers, bus 402 often includes or is a motherboard.

In one embodiment, computer control system 425 may be, or include, a general purpose computer or any other hardware equivalents configured for operation in space. Computer control system 425 may also be implemented as one or more physical devices that are coupled to processor 430 through one of more communications channels or interfaces. For example, computer control system 425 can be implemented using application specific integrated circuits (ASIC). Alternatively, computer control system 425 can be implemented as a combination of hardware and software, where the software is loaded into the processor from the memory or over a network connection.

Computer control system 425 may be programmed with a set of instructions which when executed in the processor causes the system to perform one or more methods described in the disclosure. Computer control system 425 may include many more or less components than those shown.

While some embodiments have been described in the context of fully functioning computers and computer systems, those skilled in the art will appreciate that various embodiments are capable of being distributed as a program product in a variety of forms and are capable of being applied regardless of the particular type of machine or computer readable media used to actually effect the distribution.

A computer readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like.

The present system is configured specifically to operate a plurality of tool tips all configured to be graspable by the multifunction tool. In addition to the tools illustrated in the Figures, the tool tips can be designed for any operation imaginable. A non-limiting and non-exhaustive list of tool tips for servicing tasks for the present multifunction tool on a spacecraft include, but are not limited to, fastening and unfastening of rotating fasteners: slotted and Phillips screw, internal and external hex screw, ¼ turn fasteners, scissors or saws for cutting of electrical wires, thermal blankets, lock wire, metal. Tool tips may be included for handling/clamping such as thermal blanket handling, general gripping, and static clamping. Tool tips may be included for mechanism operation: generic ground-type mechanisms such as buttons, latches, handles, manned EVA mechanisms via standard interfaces, electrical connector installation and removal. Tool tips may be included which are configured for the removal of components: fastener safety cap removal and disposal, wire insulation stripping and disposal. Tool tips may be included which are configured for leverage operations such as pry bar, expanding jaws, and a nut splitter to mention a few. Tool tips for any number of multiple miscellaneous operations may be included, for example for application of fluids via hypodermic, compression of springs, application of adhesive tapes, suturing thermal blankets together.

The multifunction tool disclosed herein may be part of a larger system for refueling satellites in orbit and may be mounted on a dedicated refueling satellite launched directly from earth on which the refueling apparatus including a tool caddy, robotic arm and various tool tips are mounted. Such a dedicated satellite may include a spacecraft docking mechanism such as that disclosed in U.S. Pat. No. 6,969,030 issued Nov. 29, 2005, which patent is incorporated herein in its entirety by reference. The apparatus may be retrofitted onto any suitable satellite to be used as a servicer satellite for refueling. The refueling satellite with the refueling apparatus mounted thereon could be carried on a larger "mother ship" and launched from there or stored on an orbiting space station and launched from there when needed. The system may be under teleoperation by a remotely located operator, for example located on earth, in the "mother ship" or in an orbiting space station. The system may also be autonomously controlled by a local Mission Manager with some levels of supervised autonomy so that in addition to being under pure teleoperation there may be mixed teleoperation/supervised autonomy.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

We claim:
1. A method for remote robotic servicing, comprising:
   a) launching a servicing spacecraft into an orbit to bring it into close proximity to a client satellite to be serviced, the spacecraft comprising
      propulsion, guidance and telemetry systems,
      a satellite capture mechanism configured to releasably capture the client satellite servicing satellite,
      a robotic arm having an end-effector, a multifunctional tool configured to be releasably grasped by said end-effector,
a suite of tool tips, said multifunctional tool configured to releasably grasp each of said tool tips, said multifunctional tool including a motive source configured to activate said tool tip when the motive source is activated,
a vision system configured to have a field of view containing a portion of the client satellite being releasably captured and at least a portion of the client satellite being serviced by the multifunctional tool,
a computer control system programmed to control movement of said robotic arm and said motive source of said multifunctional tool, and
a communication system configured to allow remote operation of said vision system, said robotic arm and said multifunctional tool;

b) maneuvering the satellite into location in close proximity to the client satellite, deploying the satellite capture mechanism and releasably capturing the client satellite;

c) deploying the robotic arm and instructing the end-effector to releasably grasp the multifunctional tool, instructing the end-effector containing the multifunctional tool to releasably engage a tool tip with the multifunctional tool, d) engaging that portion of the client satellite to be serviced with the multifunctional tool to service the client satellite; and e) wherein said communication system is configured to communicate with said computer control system for remote teleoperation control or a mixture of teleoperator and supervised autonomy control of approach to, and capturing of, the client satellite, and
all actions associated with servicing the client satellite using the robotically controlled multifunctional tool.

2. The method according to claim 1 wherein each tool tip comprises;
 a) a tool tip stator, and
 b) a tool tip rotor rotatable about a first axis relative to said tool tip stator; and
 c) said multifunctional tool including a tool holder capable of removably engaging said tool tip, said tool holder comprising
a collet,
a tool tip locker.
wherein when said tool holder engages said tool tip,
 i) said tool tip locker restricts rotational and axial movement about said first axis of said tool tip stator relative to said collet, and
 ii) said motive source is capable of rotating said tool tip rotor about said first axis relative to said tool tip stator.

* * * * *